(12) United States Patent
Marsden

(10) Patent No.: US 10,282,090 B2
(45) Date of Patent: May 7, 2019

(54) SYSTEMS AND METHODS FOR DISAMBIGUATING INTENDED USER INPUT AT AN ONSCREEN KEYBOARD USING DUAL STRIKE ZONES

(71) Applicant: Apple Inc., Cupertino, CA (US)

(72) Inventor: Randal J. Marsden, Menlo Park, CA (US)

(73) Assignee: APPLE INC., Cupertino, CA (US)

(*) Notice: Subject to any disclaimer, the term of this patent is extended or adjusted under 35 U.S.C. 154(b) by 180 days.

(21) Appl. No.: 15/273,634

(22) Filed: Sep. 22, 2016

(65) Prior Publication Data

US 2017/0090749 A1 Mar. 30, 2017

Related U.S. Application Data

(60) Provisional application No. 62/235,417, filed on Sep. 30, 2015.

(51) Int. Cl.
*G06F 3/048* (2013.01)
*G06F 3/0488* (2013.01)

(52) U.S. Cl.
CPC .............. *G06F 3/04886* (2013.01)

(58) Field of Classification Search
None
See application file for complete search history.

(56) References Cited

U.S. PATENT DOCUMENTS

| 9,377,871 | B2* | 6/2016 | Waddell | G06F 3/0237 |
|---|---|---|---|---|
| 9,471,560 | B2* | 10/2016 | Kida | G06F 17/273 |
| 2010/0053088 | A1* | 3/2010 | Bae | G06F 3/041 345/168 |
| 2011/0181522 | A1* | 7/2011 | Rendahl | G06F 3/04886 345/173 |
| 2011/0264442 | A1* | 10/2011 | Huang | G06F 3/04886 704/9 |
| 2012/0223889 | A1* | 9/2012 | Medlock | G06F 3/04883 345/168 |
| 2013/0265218 | A1* | 10/2013 | Moscarillo | G06F 3/017 345/156 |
| 2013/0285916 | A1* | 10/2013 | Griffin | G06F 3/0237 345/169 |

(Continued)

*Primary Examiner* — Hua Lu
(74) *Attorney, Agent, or Firm* — Morgan, Lewis & Bockius LLP

(57) ABSTRACT

Systems and methods for disambiguating user input using dual strikes zones are disclosed herein. An exemplary method includes: establishing a plurality of default actuation regions for each key on a virtual keyboard and providing adaptive actuation regions, each associated with a respective region of a touch-sensitive display within which a predetermined number of previous typing inputs have been received for a respective key. The method also includes: receiving a sequence of typing inputs with an observed cadence, including an ambiguous input within a first adaptive actuation region associated with a first key and within a first default actuation region associated with a second key. If the observed cadence satisfies a cadence threshold, the method includes: determining that the ambiguous input is associated with the first key and, if the observed cadence doesn't satisfy the cadence threshold, the method includes: determining that the ambiguous input is associated with the second key.

36 Claims, 18 Drawing Sheets

(56) References Cited

U.S. PATENT DOCUMENTS

| | | | |
|---|---|---|---|
| 2014/0058725 A1* | 2/2014 | Longe | G06F 3/0236 704/9 |
| 2014/0164973 A1* | 6/2014 | Greenzeiger | G06F 3/04886 715/773 |
| 2014/0223363 A1* | 8/2014 | Greene | G06F 3/01 715/810 |
| 2014/0229882 A1* | 8/2014 | Eleftheriou | G06F 17/24 715/773 |
| 2014/0329593 A1* | 11/2014 | Akkarakaran | A63F 13/42 463/31 |
| 2015/0007088 A1* | 1/2015 | Itoh | G06F 1/1643 715/773 |
| 2015/0067488 A1* | 3/2015 | Liu | G06F 17/24 715/268 |
| 2015/0084869 A1* | 3/2015 | Kim | G06F 3/0426 345/168 |
| 2015/0317069 A1* | 11/2015 | Clements | G06F 3/0237 715/773 |
| 2016/0004325 A1* | 1/2016 | Roe | G06F 3/0237 345/168 |
| 2016/0034046 A1* | 2/2016 | Waddell | G06F 3/0237 345/173 |
| 2016/0077734 A1* | 3/2016 | Buxton | G06F 3/04842 715/773 |
| 2016/0124926 A1* | 5/2016 | Fallah | G06F 17/273 715/271 |
| 2017/0123492 A1* | 5/2017 | Marggraff | G06F 3/0236 |

* cited by examiner

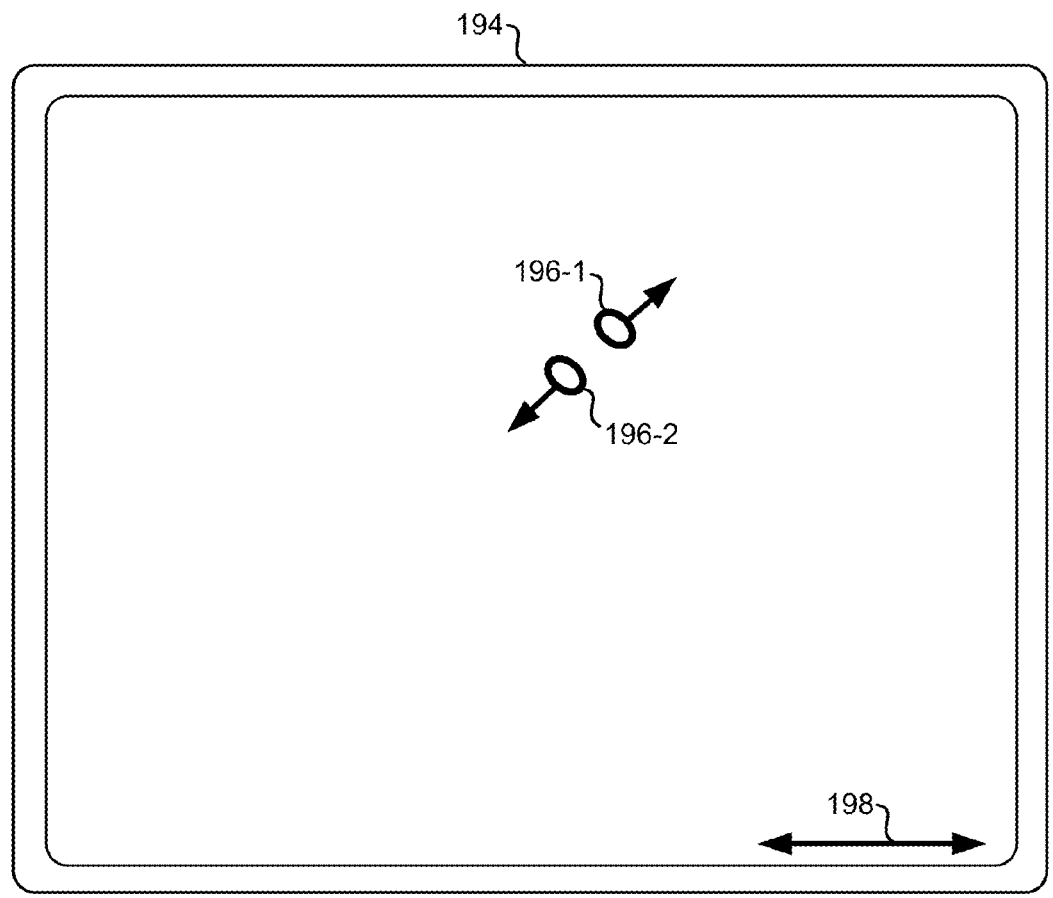
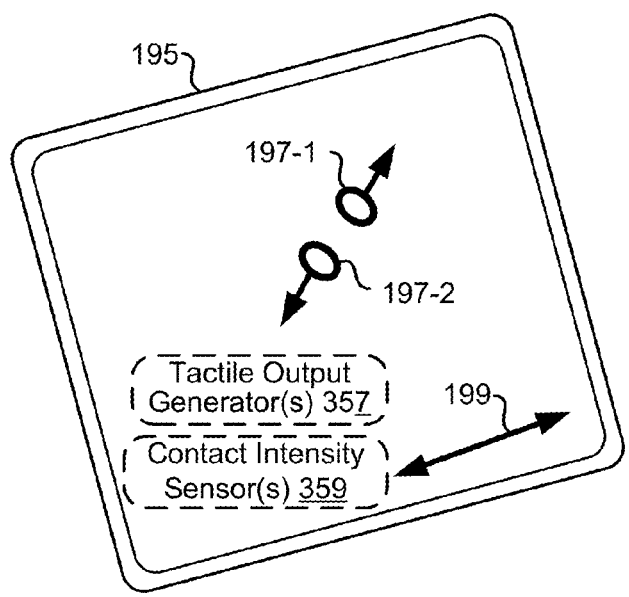
FIG. 1D

Input Mapping Data Structure 302-1

| Header 312-0 | Input Map ID | Device ID | Keyboard Type ID | User ID | Input Coordinates | Actuated Key | Predicted Word IDs |
|---|---|---|---|---|---|---|---|
| Record 312-1 | 1 | A's iPad Air 2 | 1 | A_Jones123 | {50px, 1000px} | Q | {12, 87, 34} |
| Record 312-2 | 2 | A's iPhone 6S | 2 | A_Jones123 | {500 px, 1200px} | Space Bar | {11, 23, 5, 9, 1} |
| Record 312-3 | 3 | B's iPhone 5 | 1 | A_Jones123 | {80px, 1010px} | W | {2, 67} |
| Record 312-N | ... | ... | ... | ... | ... | ... | ... |

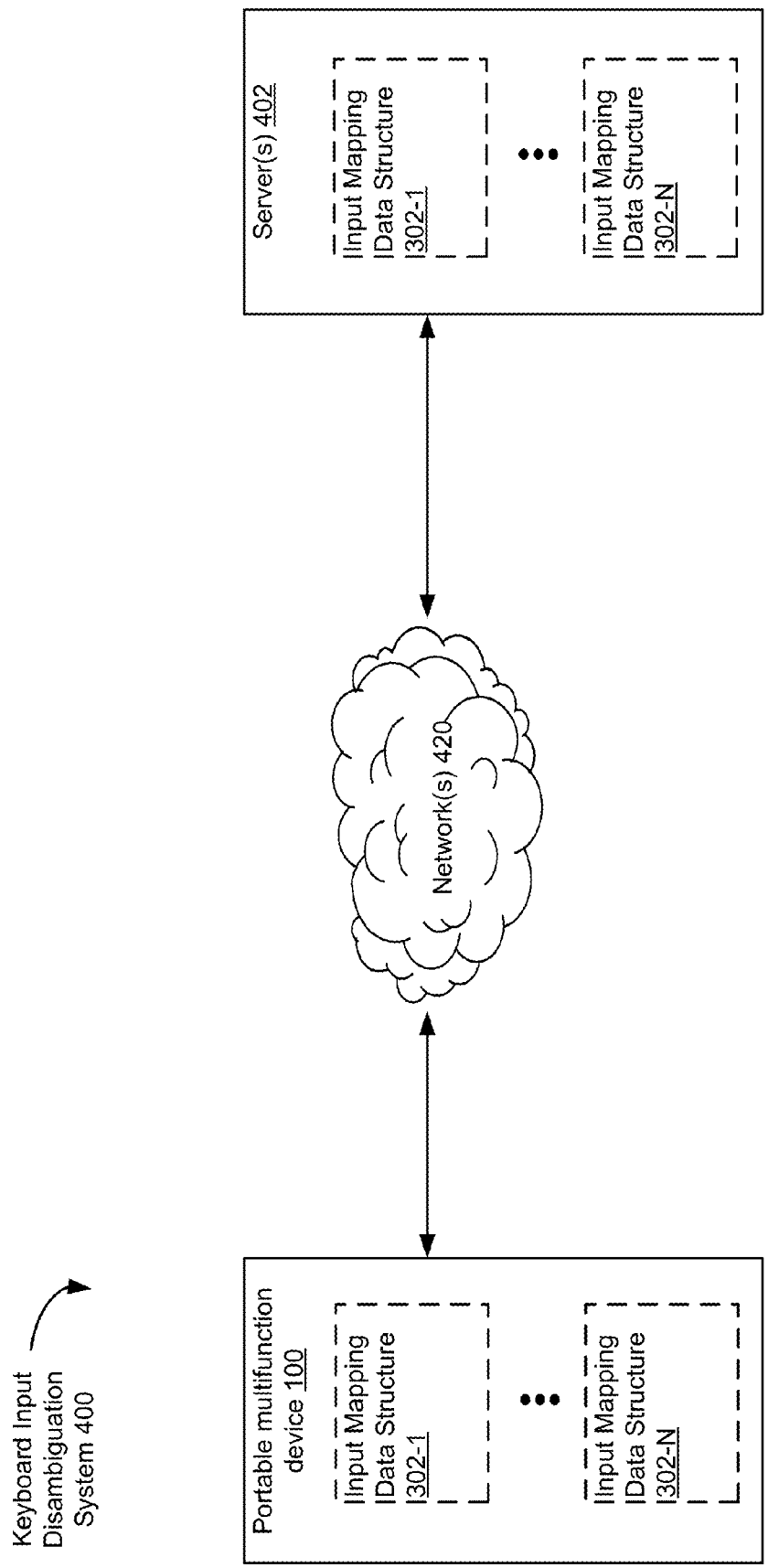

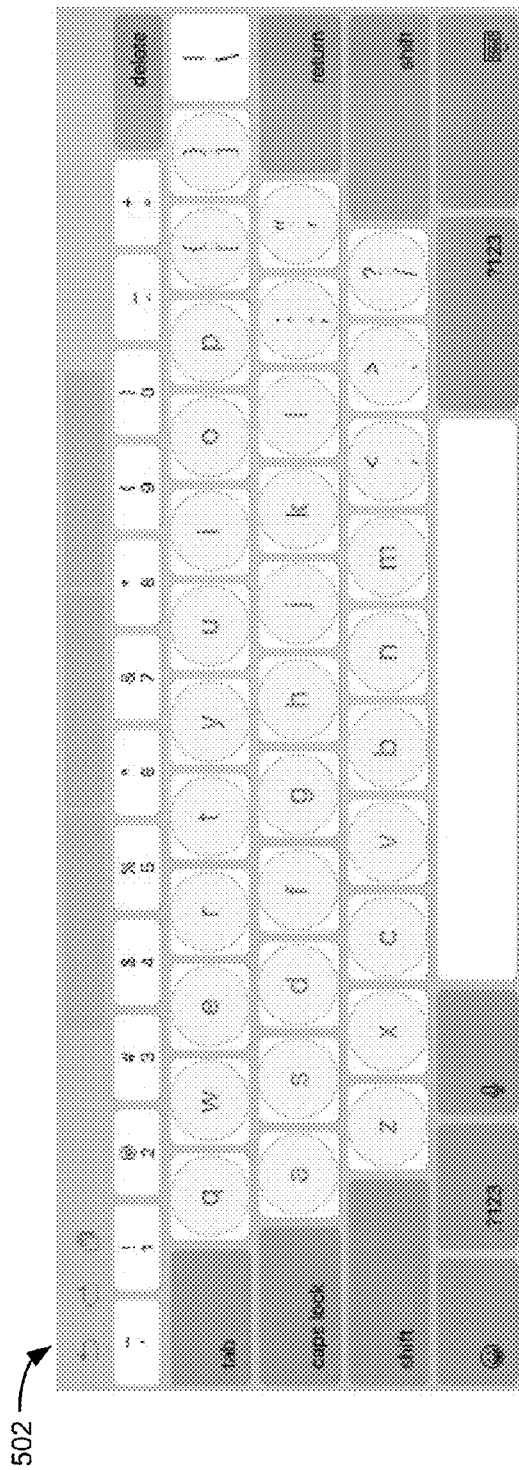
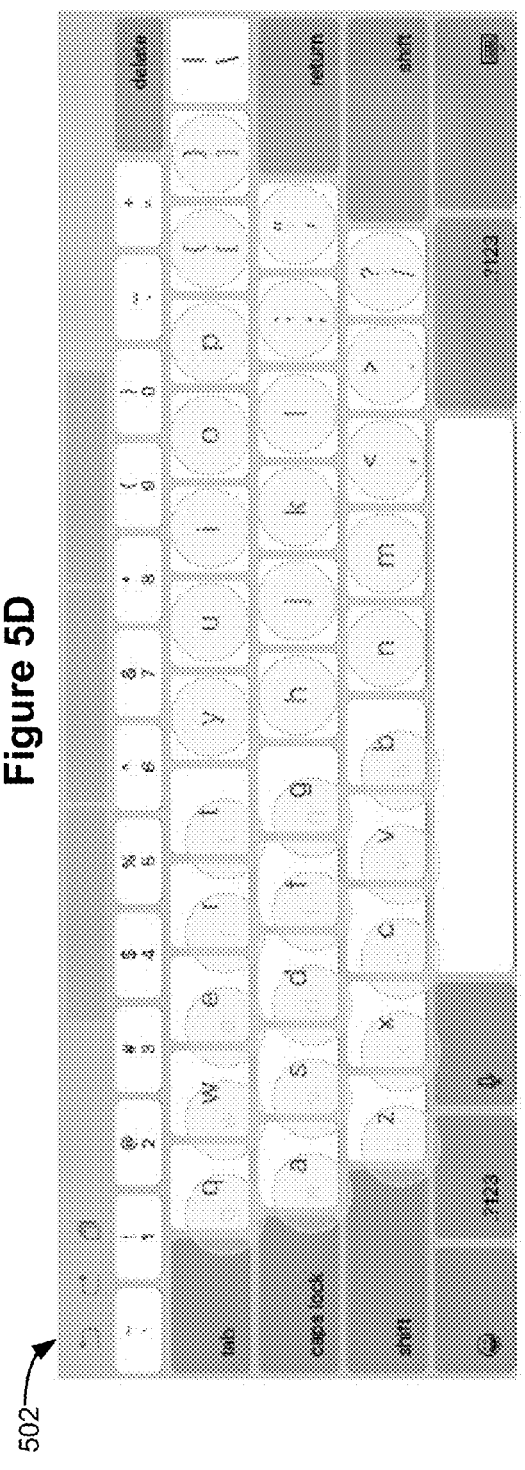
Figure 5D
Figure 5E

700

---

Establish a plurality of default actuation regions for a virtual keyboard, each respective default actuation region associated with:

(i) a respective key of a plurality of keys on the virtual keyboard and (ii) a respective first metric that provides estimates, based on user input received at the virtual keyboard, that the respective key is an intended target of the user input

— 702

---

Provide a plurality of adaptive actuation regions for the virtual keyboard, each respective adaptive actuation region associated with:

(i) a region of the touch-sensitive display within which a predetermined number of previous typing inputs have been received for a single key of the plurality of keys of the virtual keyboard and (ii) a respective second metric that provides estimates, based on user input received at the virtual keyboard, that the single key is an intended target of the user input

— 704

---

Receive, at the virtual keyboard, typing inputs with an observed cadence — 706

---

In response to receiving the typing inputs:

(i) generate weighted metrics by adjusting at least one of the respective second metric and the respective first metric, such that the adjusting is based at least in part on the observed cadence and (ii) actuate keys on the virtual keyboard in accordance with the weighted metrics

SYSTEMS AND METHODS FOR DISAMBIGUATING INTENDED USER INPUT AT AN ONSCREEN KEYBOARD USING DUAL STRIKE ZONES

RELATED APPLICATIONS

This application claims priority to U.S. Provisional Application Ser. No. 62/235,417, filed Sep. 30, 2015, which is hereby incorporated by reference in its entirety.

TECHNICAL FIELD

The embodiments herein generally relate to electronic devices with touch-sensitive displays and, more specifically, to systems and methods for disambiguating intended user input at an onscreen keyboard using dual strike zones.

BACKGROUND

Handheld electronic devices with touch-sensitive displays often include interfaces that allow users to type at an onscreen or virtual (i.e., soft) keyboard instead of having to carry around and connect an external, physical keyboard. Due to the dimensions of touch-sensitive displays on handheld electronic devices, these onscreen keyboards are typically much smaller than conventional external, physical keyboards. For example, each key on an onscreen keyboard is typically smaller than corresponding keys of an external, physical keyboard and the spacing between each key is also typically less than the spacing between keys of an external, physical keyboard. Due to these differences, interpreting typing input received at an onscreen keyboard can be less reliable.

SUMMARY

Accordingly, there is a need for electronic devices with more accurate methods and interfaces for disambiguating intended user input at an onscreen keyboard. Such methods and interfaces optionally complement or replace conventional methods for disambiguating intended user input at an onscreen keyboard. Such methods and interfaces improve typing accuracy at onscreen keyboards. Moreover, by improving typing accuracy, such methods and interfaces help to extend the life of the touch-sensitive display by requiring a fewer number of touch inputs (e.g., by eliminating the need for users to repeatedly interact with the device in order to correct spelling errors), and thereby improve users' satisfaction with their devices.

The above deficiencies and other problems associated with user interfaces for electronic devices with touch-sensitive surfaces are reduced or eliminated by the devices disclosed herein. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touchscreen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photography, digital video, web browsing, and digital music. Executable instructions for performing these functions are, optionally, included in a non-transitory computer-readable storage medium or other computer program product configured for execution by one or more processors.

(A1) In accordance with some embodiments, a method is performed at an electronic device (e.g., portable multifunction device 100, FIG. 1A) with a touch-sensitive display (touch screen 112, FIG. 1C). The method includes: establishing a plurality of default actuation regions for a virtual keyboard, each respective default actuation region associated with a respective key of a plurality of keys on the virtual keyboard (e.g., default actuation region 518-1 is associated with the "Z" key, FIG. 5A). The method further includes: providing a plurality of adaptive actuation regions for the virtual keyboard, each respective adaptive actuation region associated with a region of the touch-sensitive display within which a predetermined number of previous typing inputs have been received for a single key of the plurality of keys of the virtual keyboard (e.g., adaptive actuation region 516-1 is associated with a region of touch-sensitive display 112 in which typing inputs for the Z-key have been received, FIG. 5B). The method also includes: receiving, at the virtual keyboard, a sequence of new typing inputs with an observed cadence, the sequence of new typing inputs including an ambiguous typing input that is within a first adaptive actuation region associated with a first key and is within a first default actuation region associated with a second key (e.g., a location of typing input 520-1 is within an adaptive actuation region 520-1 associated with the Z key and is also within a default actuation region for X key, FIG. 5C). In accordance with a determination that the observed cadence satisfies a cadence threshold, the method includes: determining that the ambiguous typing input is associated with the first key (e.g., if the determination reveals that the observed typing cadence is fast cadence, then the ambiguous typing input is associated with the Z key). In accordance with a determination that the observed cadence does not satisfy the cadence threshold, determining that the ambiguous typing input is associated with the second key (e.g., if the determination reveals that the observed typing cadence is fast cadence, then the ambiguous typing input is associated with the X key).

(A2) In some embodiments of the method of A1, each respective adaptive actuation region of the plurality of adaptive actuation regions is established by identifying a region of the touch-sensitive display that encompasses the predetermined number of previous typing inputs for a respective single key. In some embodiments, identifying includes drawing a shape that encompasses the predetermined number of previous typing inputs.

(A3) In some embodiments of the method of any one of A1-A2, the method further includes: receiving user input requesting to change the virtual keyboard to a new keyboard format (e.g., from a QWERTY layout to an Emoji layout) and, in response to receiving the user input requesting to change the virtual keyboard to the new keyboard format, providing a new plurality of adaptive actuation regions that are associated with the new keyboard format.

(A4) In some embodiments of the method of any one of A1-A3, the plurality of adaptive actuation regions are provided for a predefined subset of the plurality of keys of the virtual keyboard.

(A5) In some embodiments of the method of A4, the predefined subset corresponds to alphanumeric keys on the virtual keyboard.

(A6) In some embodiments of the method of any one of A1-A5, the plurality of adaptive actuation regions is a default plurality associated with the electronic device and the method further comprises, after detecting the observed cadence, determining a user that is currently typing at the electronic device based at least in part on the observed cadence, and providing a new plurality of adaptive actuation regions that is specifically associated with the determined user.

(A7) In some embodiments of the method of any one of A1-A6, the method further includes: receiving user feedback that changes the determined association for the ambiguous typing input to a new key (e.g., user manual changes a letter that was previously typed) and, in response to receiving the user feedback that changes the determined association, modifying the adaptive actuation region associated with the new key (e.g., remove the typing input from the adaptive actuation region for the previously determined key (first or second key) and add the typing input to the adaptive actuation region for the new key).

(A8) In some embodiments of the method of any one of A1-A7, the method further includes: further comprising, after receiving each typing input in the sequence of typing inputs, determining an intended key associated with the typing input and updating a respective adaptive actuation region that is associated with the determined intended key.

(A9) In some embodiments of the method of any one of A1-A8, the cadence threshold is specifically associated with a current user of the electronic device.

(A10) In some embodiments of the method of any one of A1-A9, each respective default actuation region of the plurality of default actuation regions is associated with a respective first metric that provides estimates, based on user input (e.g., based on one or more typing inputs of the sequence of typing inputs) at the virtual keyboard, that a respective key associated with a respective default actuation region is an intended target of the user input.

(A11) In some embodiments of the method of A10, each respective adaptive actuation region of the plurality of adaptive actuation regions is associated with a respective second metric that provides estimates, based on the user input at the virtual keyboard, that a respective single key is the intended target of the user input.

(A12) In some embodiments of the method of A11, the first metrics and the second metrics are weighted in accordance with a plurality of weighting factors, the plurality of weighting factors including the observed cadence, predicted unigrams and n-grams based on the user input, and whether the electronic device is currently positioned in a substantially flat or a substantially angled position.

(A13) In another aspect, an electronic device is provided. In some embodiments, the electronic device includes: a touch-sensitive display, one or more processors, and memory storing one or more programs, which when executed by the one or more processors cause the electronic device to perform the method described in any one of A1-A12.

(A14) In yet another aspect, an electronic device is provided and the electronic device includes: a touch-sensitive display and means for performing the method described in any one of A1-A12.

(A15) In still another aspect, a non-transitory computer-readable storage medium is provided. The non-transitory computer-readable storage medium stores executable instructions that, when executed by an electronic device with a touch-sensitive display, cause the electronic device to perform the method described in any one of A1-A12.

(A16) In still one more aspect, a graphical user interface on an electronic device with a touch-sensitive display is provided. In some embodiments, the graphical user interface includes user interfaces displayed in accordance with the method described in any one of A1-A12.

(A17) In one additional aspect, an electronic device is provided that includes a display unit (e.g., display unit 801, FIG. 8), a touch-sensitive surface unit (e.g., touch-sensitive surface unit 803, FIG. 8), and a processing unit (e.g., processing unit 805, FIG. 8) coupled with the display unit 801 and the touch-sensitive surface unit 803. In some embodiments, the display unit and the touch-sensitive surface unit are integrated in a single touch-sensitive display unit (also referred to herein as a touch-sensitive display). In some embodiments, the processing unit includes an establishing unit (e.g., establishing unit 807), a providing unit (e.g., providing unit 809), a receiving unit (e.g., receiving unit 811), and a determining unit (e.g., determining unit 813). The processing unit is configured to: establish (e.g., with the establishing unit 807) a plurality of default actuation regions for a virtual keyboard, each respective default actuation region associated with a respective key of a plurality of keys on the virtual keyboard; provide (e.g., with the providing unit 809) a plurality of adaptive actuation regions for the virtual keyboard, each respective adaptive actuation region associated with a region of the touch-sensitive display unit within which a predetermined number of previous typing inputs have been received for a single key of the plurality of keys of the virtual keyboard; receive (e.g., with the receiving unit 811), at the virtual keyboard, a sequence of new typing inputs with an observed cadence, the sequence of new typing inputs including an ambiguous typing input that is within a first adaptive actuation region associated with a first key and is within a first default actuation region associated with a second key; in accordance with a determination that the observed cadence satisfies a cadence threshold, determine that the ambiguous typing input is associated with the first key (e.g., with the determining unit 813); and in accordance with a determination that the observed cadence does not satisfy the cadence threshold, determine that the ambiguous typing input is associated with the second key (e.g., with the determining unit 813).

(A19) In some embodiments of the electronic device of A18, the processing unit is further configured to: perform the method described in any one of A2-A12 described above.

(B1) In accordance with some embodiments, a method is performed at an electronic device (e.g., portable multifunction device 100, FIG. 1A) with a touch-sensitive display (touch screen 112, FIG. 1C). The method includes: establishing a plurality of default actuation regions for a virtual keyboard, each respective default actuation region associated with: (i) a respective key of a plurality of keys on the virtual keyboard and (ii) a respective first metric that provides estimates, based on user input received at the virtual keyboard, that the respective key is an intended target of the user input. The method further includes: providing a plurality of adaptive actuation regions for the virtual keyboard, each respective adaptive actuation region associated with: (i) a region of the touch-sensitive display within which a predetermined number of previous typing inputs have been received for a single key of the plurality of keys of the virtual keyboard and (ii) a respective second metric that provides estimates, based on user input received at the virtual keyboard, that the single key is an intended target of the user input. The method also includes: receiving, at the virtual keyboard, typing inputs with an observed cadence. In response to receiving the typing inputs, the method includes: (i) generating weighted metrics by adjusting at least one of the respective second metric and the respective first metric, wherein the adjusting is based at least in part on the observed cadence; and (ii) actuating keys on the virtual keyboard in accordance with the weighted metrics.

(B2) In some embodiments of the method of B1, each respective adaptive actuation region of the plurality of adaptive actuation regions is established by identifying a region of the touch-sensitive display that encompasses the predetermined number of previous typing inputs for a respective single key.

(B3) In some embodiments of the method of any one of B1-B2, the method further includes: receiving user input requesting to change the virtual keyboard to a new keyboard format and, in response to receiving the user input requesting to change the virtual keyboard to the new keyboard format, providing a new plurality of adaptive actuation regions that are associated with the new keyboard format.

(B4) In some embodiments of the method of any one of B1-B3, the plurality of adaptive actuation regions is a default plurality associated with the electronic device and the method further comprises, after detecting the observed cadence, determining a user that is currently typing at the electronic device based at least in part on the observed cadence, and providing a new plurality of adaptive actuation regions that is specifically associated with the determined user.

(B5) In some embodiments of the method of any one of B1-B4, the plurality of adaptive actuation regions are provided for a predefined subset of the plurality of keys of the virtual keyboard.

(B6) In some embodiments of the method of any one of B1-B5, the predefined subset corresponds to alphanumeric keys on the virtual keyboard.

(B7) In some embodiments of the method of any one of B1-B6, the method further includes: after receiving each typing input in the typing inputs, determining an intended key associated with the typing input and updating a respective adaptive actuation region that is associated with the determined intended key.

(B8) In another aspect, an electronic device is provided. In some embodiments, the electronic device includes: a touch-sensitive display, one or more processors, and memory storing one or more programs, which when executed by the one or more processors cause the electronic device to perform the method described in any one of B1-B7.

(B9) In yet another aspect, an electronic device is provided and the electronic device includes: a touch-sensitive display and means for performing the method described in any one of B1-B7.

(B10) In still another aspect, a non-transitory computer-readable storage medium is provided. The non-transitory computer-readable storage medium stores executable instructions that, when executed by an electronic device with a touch-sensitive display, cause the electronic device to perform the method described in any one of B1-B7.

(B11) In still one more aspect, a graphical user interface on an electronic device with a touch-sensitive display is provided. In some embodiments, the graphical user interface includes user interfaces displayed in accordance with the method described in any one of B1-B7.

(B12) In one additional aspect, an electronic device is provided that includes a display unit (e.g., display unit 901, FIG. 9), a touch-sensitive surface unit (e.g., touch-sensitive surface unit 903, FIG. 9), and a processing unit (e.g., processing unit 905, FIG. 9) coupled with the display unit 901 and the touch-sensitive surface unit 903. In some embodiments, the display unit and the touch-sensitive surface unit are integrated in a single touch-sensitive display unit (also referred to herein as a touch-sensitive display). In some embodiments, the processing unit includes an establishing unit (e.g., establishing unit 907), a providing unit (e.g., providing unit 909), a receiving unit (e.g., receiving unit 911), an generating unit (e.g., generating unit 913), and an actuating unit (e.g., actuating unit 915). The processing unit is configured to: establish (e.g., with the establishing unit 907) a plurality of default actuation regions for a virtual keyboard, each respective default actuation region associated with: (i) a respective key of a plurality of keys on the virtual keyboard and (ii) a respective first metric that provides estimates, based on user input received at the virtual keyboard, that the respective key is an intended target of the user input; provide (e.g., with the providing unit 909) a plurality of adaptive actuation regions for the virtual keyboard, each respective adaptive actuation region associated with: (i) a region of the touch-sensitive display within which a predetermined number of previous typing inputs have been received for a single key of the plurality of keys of the virtual keyboard and (ii) a respective second metric that provides estimates, based on user input received at the virtual keyboard, that the single key is an intended target of the user input; receive (e.g., with the receiving unit 911), at the virtual keyboard, typing inputs with an observed cadence; in response to receiving the typing inputs: (i) generate (e.g., with the establishing unit 913) weighted metrics by adjusting at least one of the respective second metric and the respective first metric, wherein the adjusting is based at least in part on the observed cadence; and (ii) actuate (e.g., with the actuating unit 913) keys on the virtual keyboard in accordance with the weighted metrics.

(B13) In some embodiments of the electronic device of B12, the processing unit is further configured to: perform the method described in any one of B2-B7 described above.

Thus, electronic devices with displays, touch-sensitive surfaces and optionally one or more sensors to detect intensity of contacts with the touch-sensitive surface are provided with more accurate methods and interfaces for disambiguating intended user input at an onscreen keyboard, thereby increasing the effectiveness, efficiency, and user satisfaction with such devices. Such methods and interfaces may complement or replace conventional methods for disambiguating user input at an onscreen keyboard.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments section below, in conjunction with the following drawings in which like reference numerals refer to corresponding parts throughout the drawings.

FIG. 1D is a schematic used to illustrate a computing device with a touch-sensitive surface that is separate from the display, in accordance with some embodiments.

FIG. 4 is a block diagram illustrating an exemplary keyboard input disambiguation system, in accordance with some embodiments.

FIGS. 5D-5K are schematics of a user interface (e.g., displayed on touch-sensitive display 112) that includes a keyboard 502 with default actuation regions that move their positions in response to movement of a user's hands or individual fingers across the keyboard 502, in accordance with some embodiments.

FIGS. 6 and 7 are flowcharts depicting methods of disambiguating intended user input at an onscreen keyboard using dual strike zones, in accordance with some embodiments.

DESCRIPTION OF EMBODIMENTS

As discussed above and in more detail below, there is a need for electronic devices with more accurate methods and interfaces for disambiguating intended user input at an onscreen keyboard. Disclosed herein are novel methods and interfaces to address these needs. Such methods and interfaces optionally complement or replace conventional methods for disambiguating user input at an onscreen keyboard. Such methods and interfaces establish and utilize two distinct strike zones for each key of an onscreen keyboard (e.g., a default and an adaptive strike zone, also referred to as default actuation regions and adaptive actuation regions) in order to more reliable determine intended keys actuated by a user. For example, if a user is typing at a cadence that satisfies a cadence threshold (i.e., revealing that the user is typing quickly), then the adaptive strike zones are weighted more than the home strike zones and if the user is typing at a cadence that does not satisfy the cadence threshold, the home strike zones are weighted more than the adaptive strike zones. By relying on dual strike zones for each key and combining the strike zones with cadence data, intended keys can be determined more rapidly and reliably. Thus, the methods and interfaces disclosed herein improve typing accuracy at onscreen keyboards. Moreover, by improving typing accuracy, such methods and interfaces help to extend the life of the touch-sensitive display by requiring a fewer number of touch inputs (e.g., by eliminating the need for users to repeatedly interact with the device in order to correct spelling errors) and improve users' satisfaction with their devices.

Figure 1A:
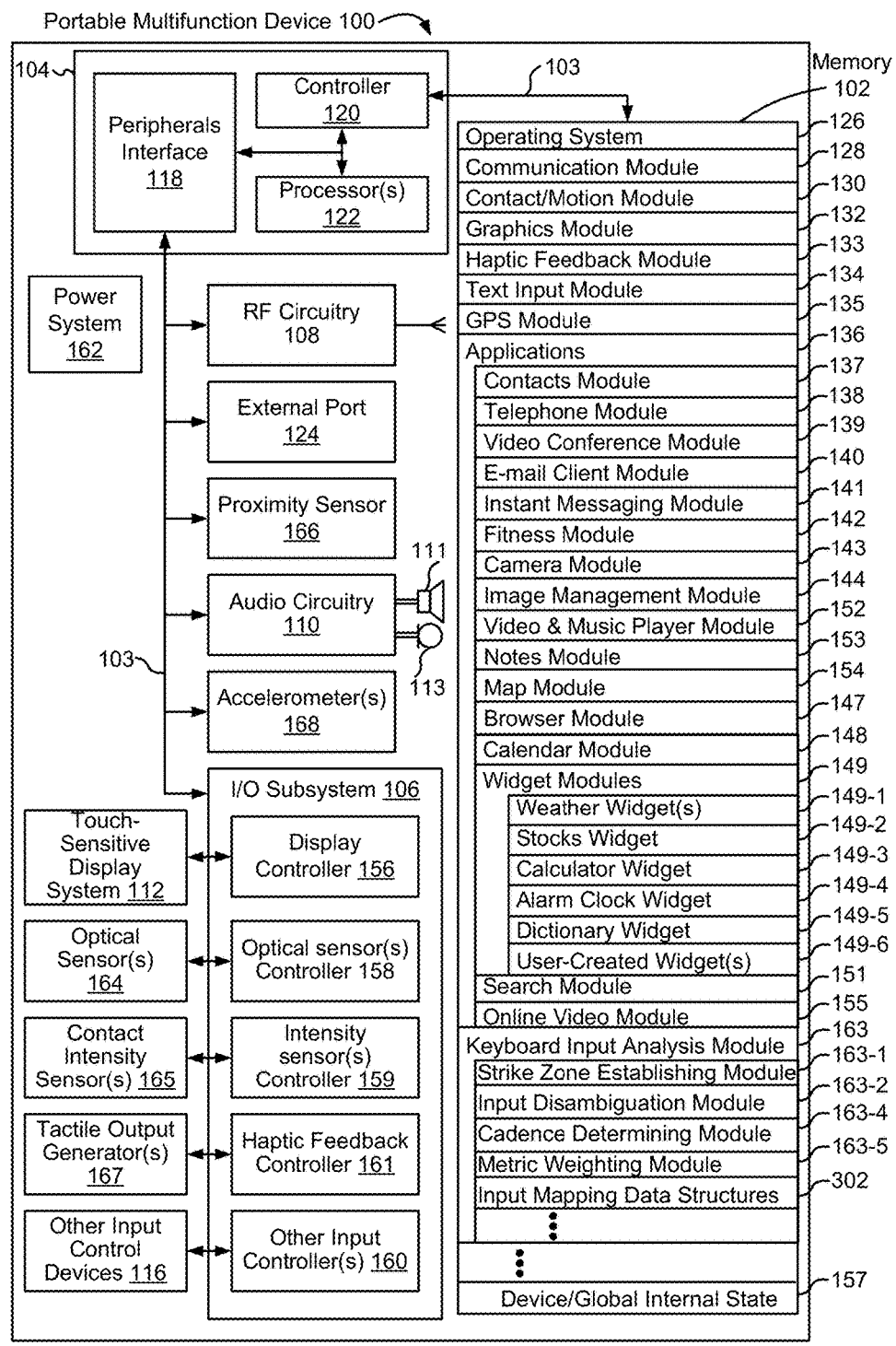
FIG. 1A is a high-level block diagram of a computing device with a touch-sensitive display, in accordance with some embodiments.
Figure 1B:
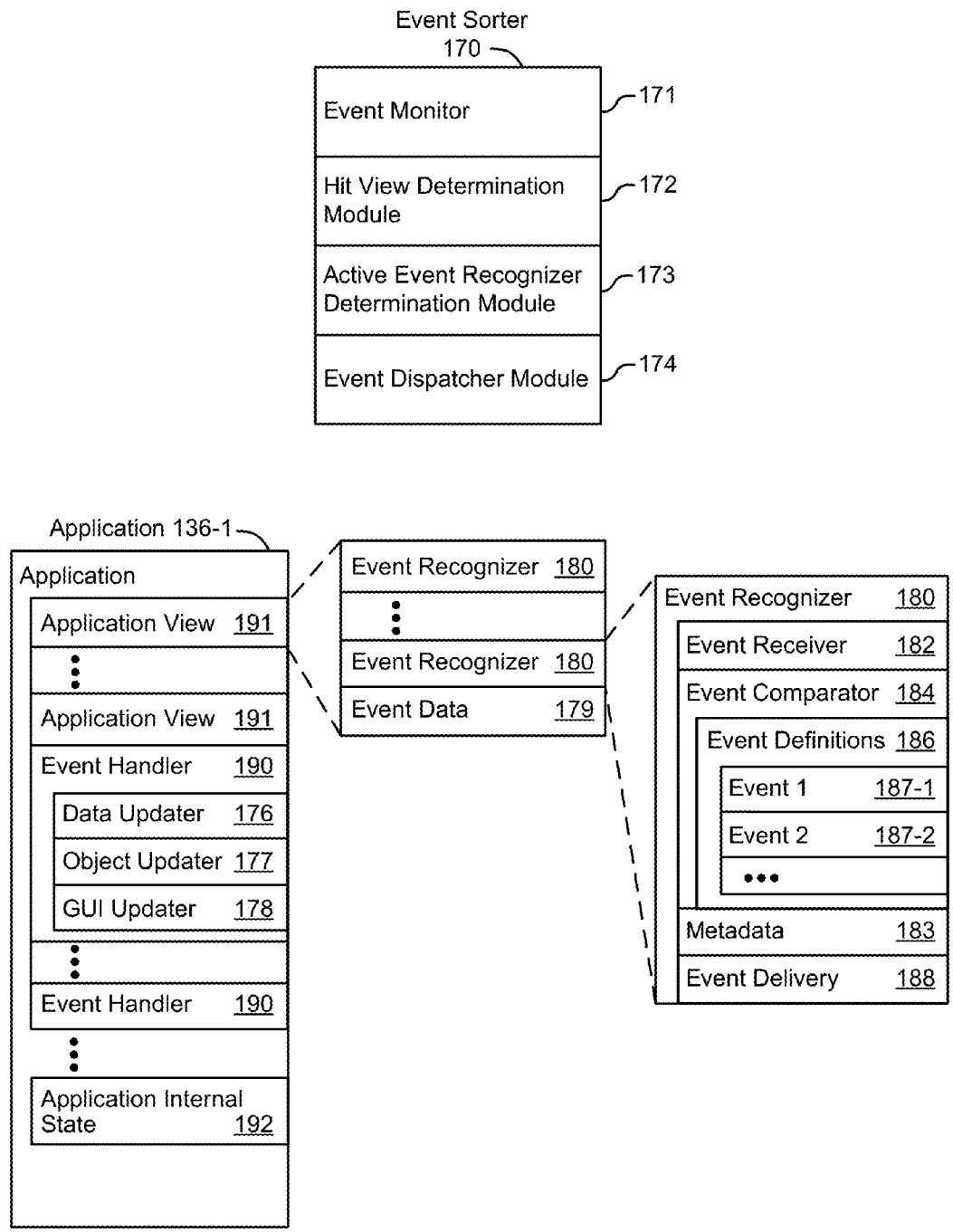
FIG. 1B is a block diagram of exemplary components for event handling, in accordance with some embodiments.
Figure 2:
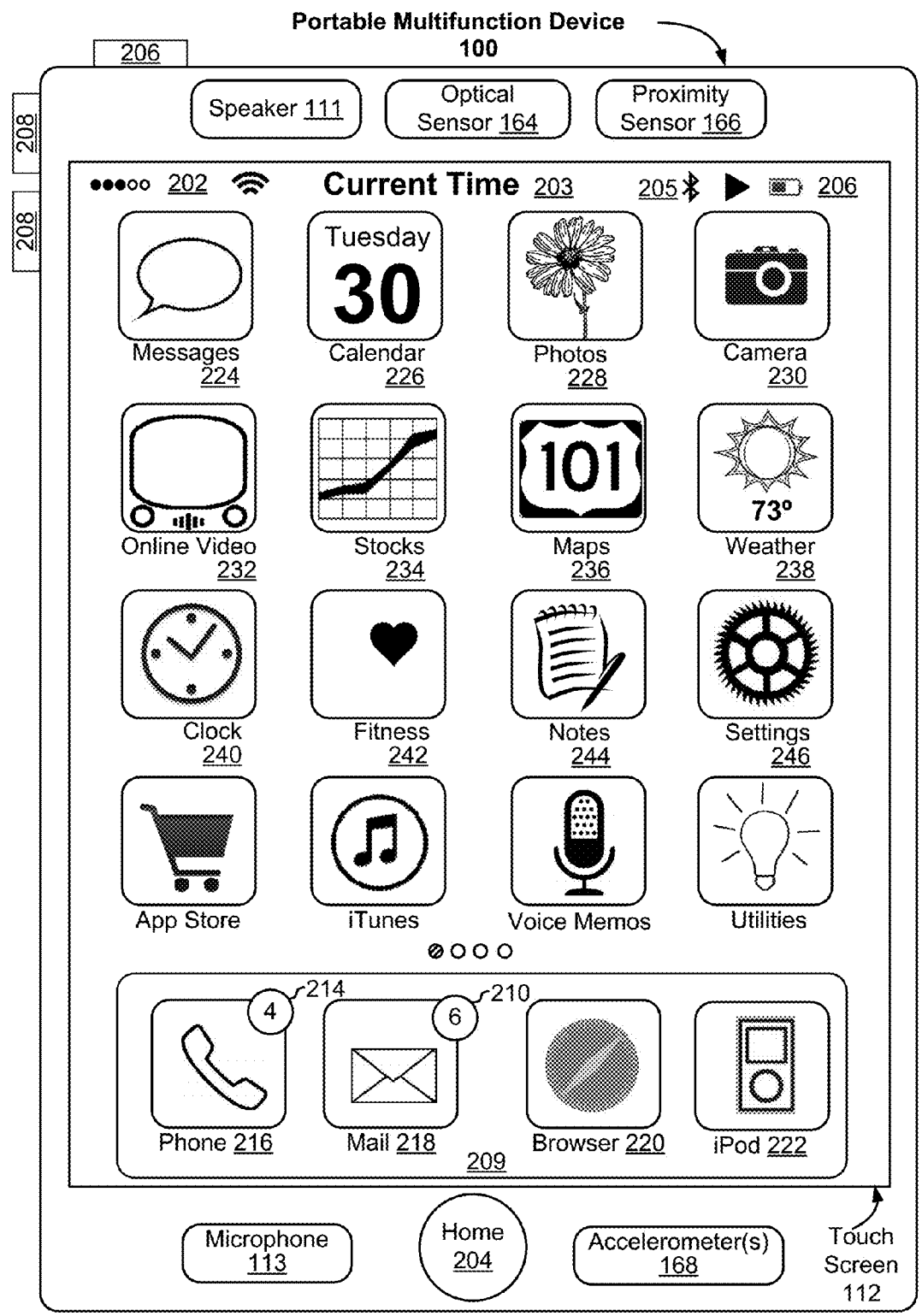
FIG. 2 is a schematic of a touch screen used to illustrate a user interface for a menu of applications, in accordance with some embodiments.
Figures 3A, 3B:
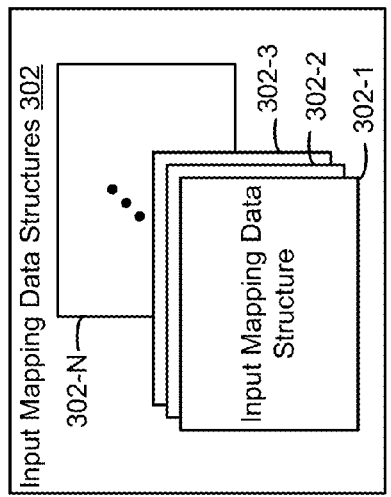
FIGS. 3A-3B are block diagrams illustrating data structures for storing information identifying locations of input at an onscreen keyboard, in accordance with some embodiments.
Figure 5A:
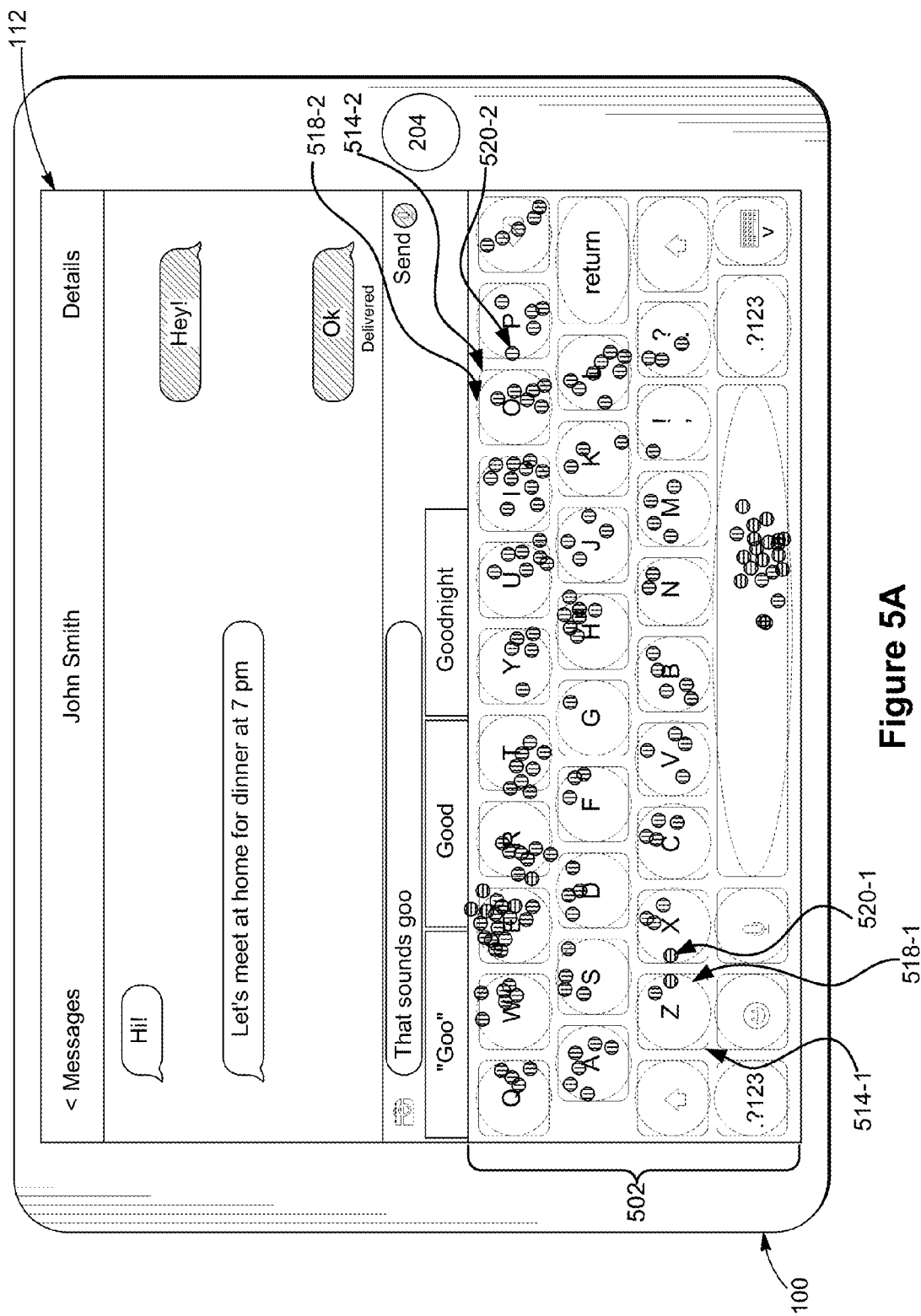
FIGS. 5A-5C are schematics of a touch screen used to illustrate default and adaptive actuation regions based on locations of input at an onscreen keyboard, in accordance with some embodiments.
Figure 5B:
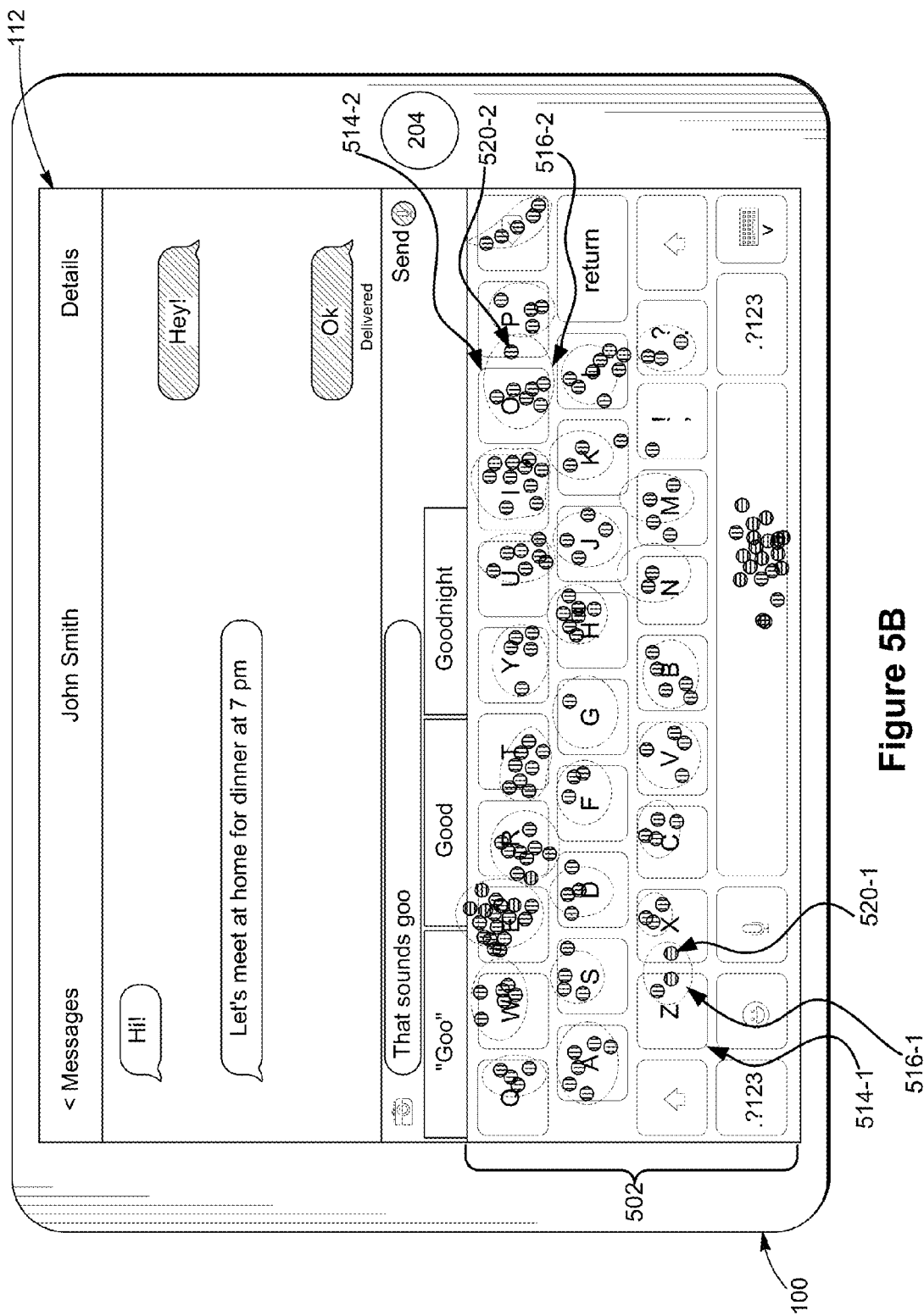
Figure 5C:
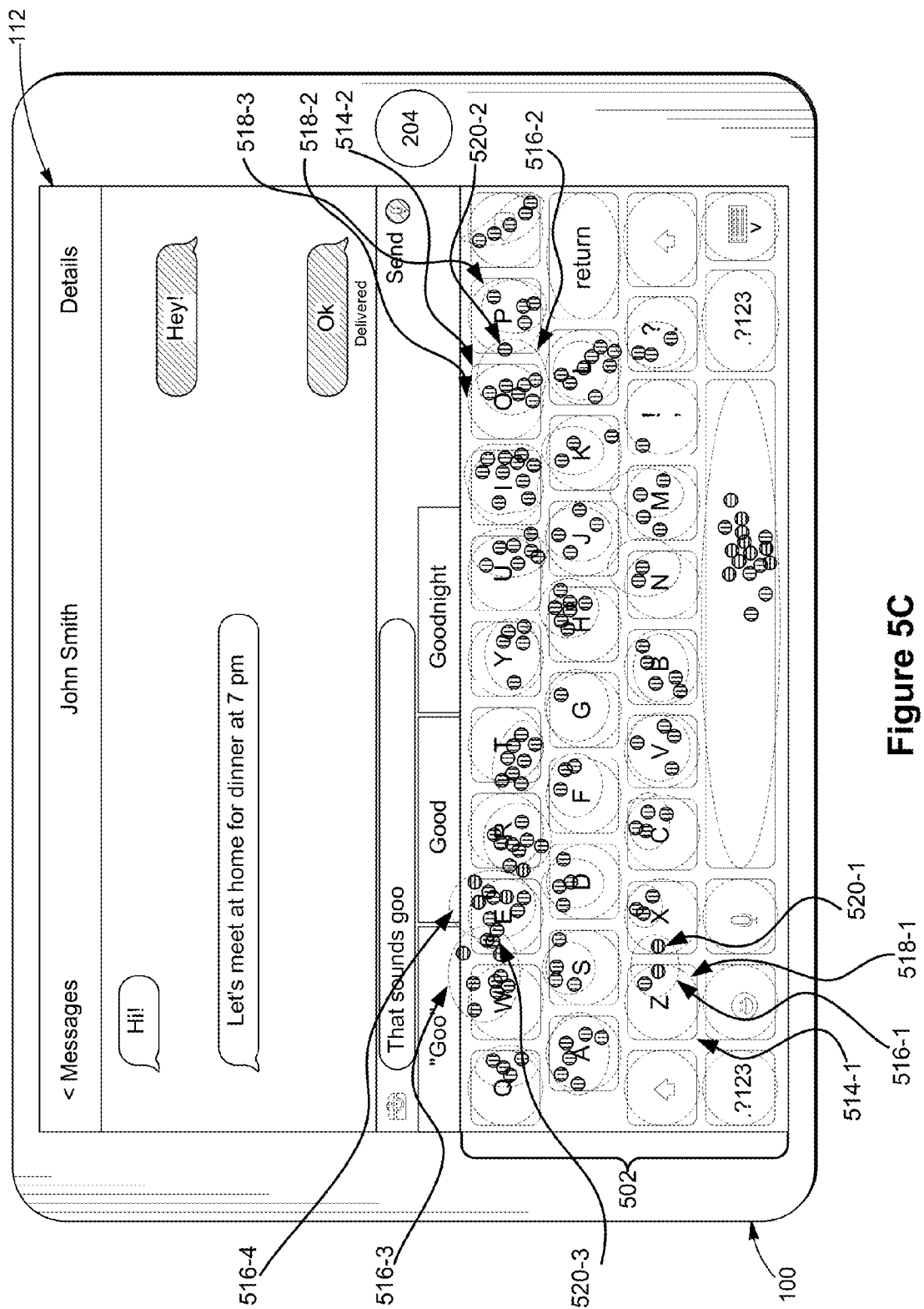
Figure 6:
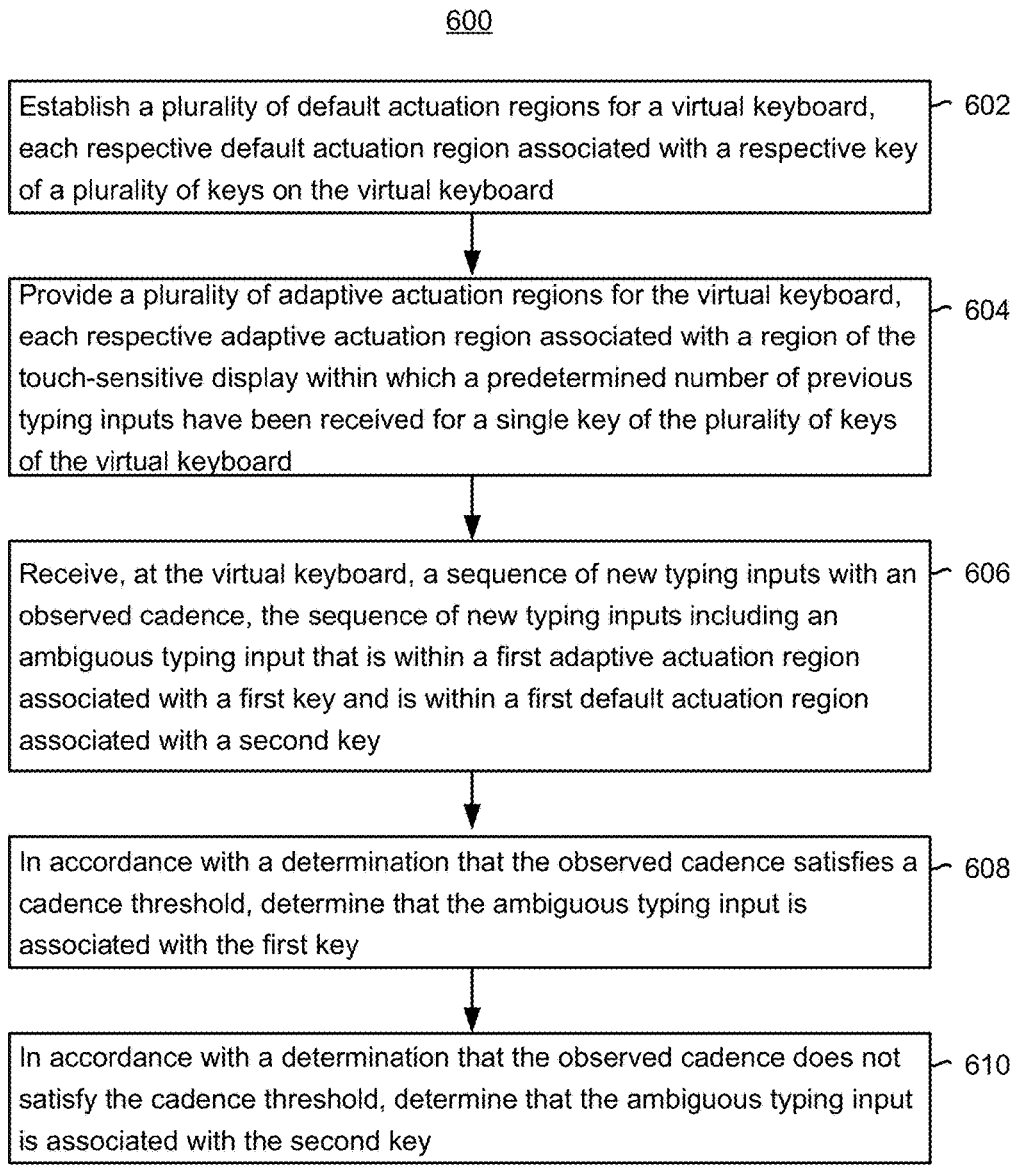
Figure 8:
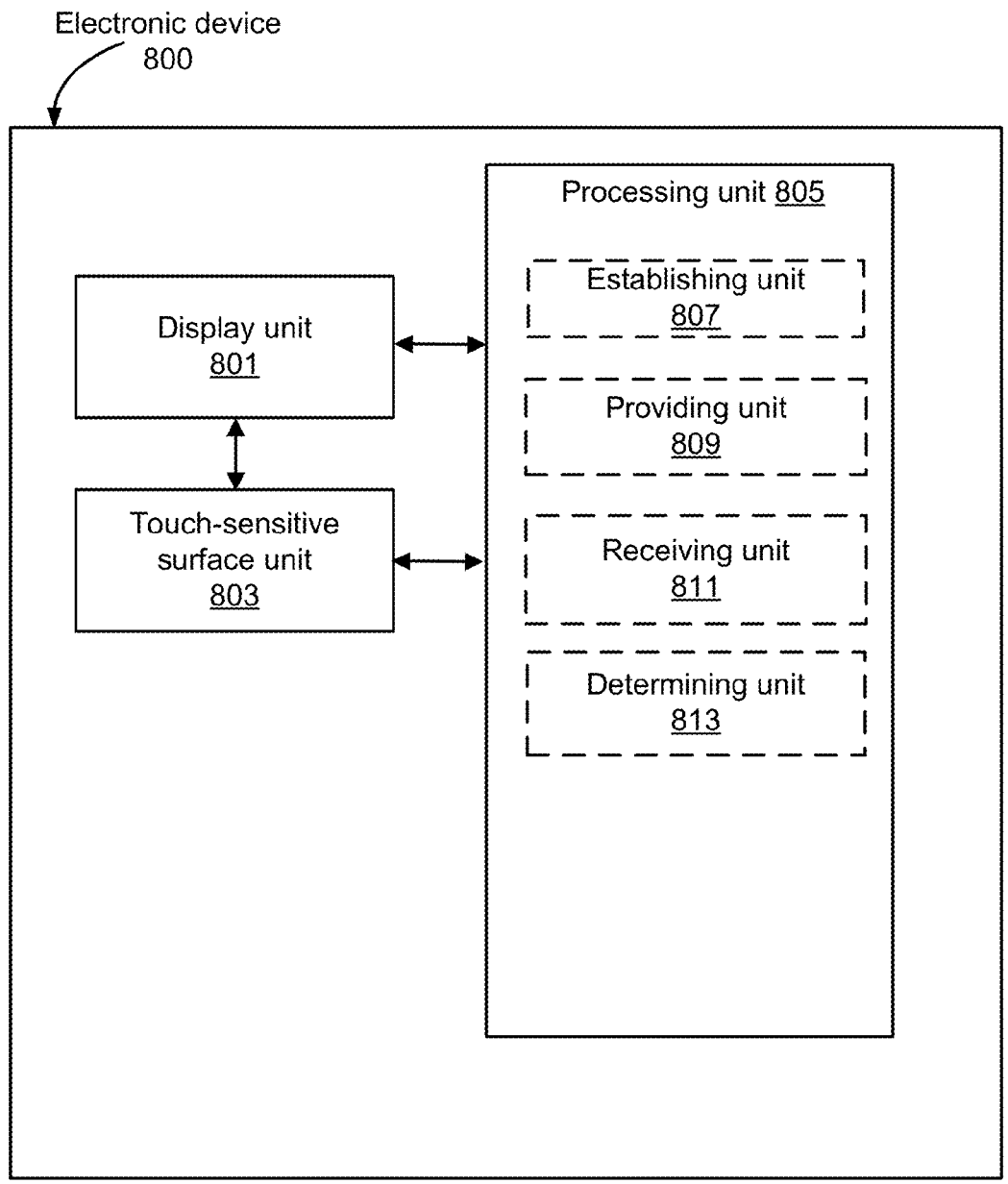
FIGS. 8 and 9 are functional block diagrams of electronic devices, in accordance with some embodiments.
Figure 9:
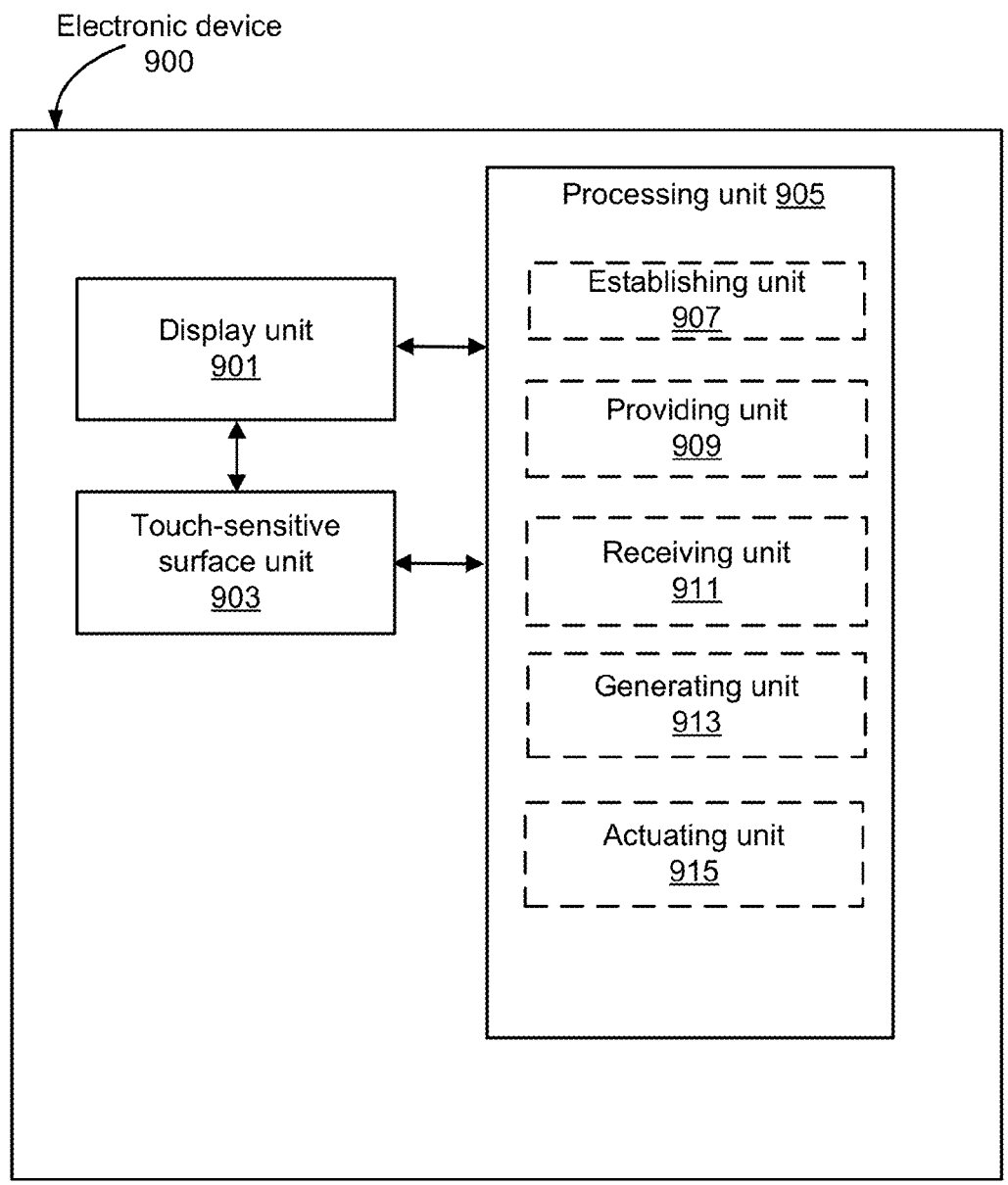

Below, FIGS. 1A-1B and 2 provide a description of exemplary devices. FIGS. 8 and 9 provide functional block diagrams of exemplary electronic devices. FIGS. 3A-3B are block diagrams of exemplary data structures that are used for storing information identifying locations of input at an onscreen keyboard to generate and provide intelligent time to leave reminders (these data structures are used in methods described below in reference to FIGS. 6 and 7). FIG. 4 is a block diagram illustrating an exemplary keyboard input disambiguation system (the exemplary system is used in methods described below in reference to FIGS. 6 and 7). FIGS. 6 and 7 are flowcharts depicting methods of disambiguating user input at a virtual keyboard using dual strike zones. FIGS. 5A-5C are schematics of a touch screen used to illustrate default and adaptive actuation regions based on locations of input at an onscreen keyboard. FIGS. 3A-3B, 4, and 5A-5C are used to illustrate the methods and/or processes of FIGS. 6 and 7.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The disclosure herein interchangeably refers to detecting a touch input on, at, over, on top of, or substantially within a particular user interface element or a particular portion of a touch-sensitive display. As used herein, a touch input that is detected "at" a particular user interface element could also be detected "on," "over," "on top of," or "substantially within" that same user interface element, depending on the context. In some embodiments and as discussed in more detail below, desired sensitivity levels for detecting touch inputs are configured by a user of an electronic device (e.g., the user could decide (and configure the electronic device to operate) that a touch input should only be detected when the touch input is completely within a user interface element).

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the IPHONE®, IPOD TOUCH®, and IPAD® devices from APPLE Inc. of Cupertino, Calif. Other portable electronic devices, such as laptops or tablet computers with touch-sensitive surfaces (e.g., touch-sensitive displays and/or touch pads), are, optionally, used. It should also be understood that, in some embodiments, the device is not a portable communications device, but is a desktop computer with a touch-sensitive surface (e.g., a touch-sensitive display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a fitness application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable electronic devices with touch-sensitive displays. FIG. 1A is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, CPU 122, and controller 120 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.11a, IEEE 802.11b, IEEE 802.11g and/or IEEE 802.11n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the IPHONE®, IPOD TOUCH®, and IPAD® from APPLE Inc. of Cupertino, Calif.

Touch screen 112 optionally has a video resolution in excess of 400 dpi. In some embodiments, touch screen 112 has a video resolution of at least 600 dpi. In other embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)), and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, keyboard input analysis module 163, strike zone establishing module 163-1, input disambiguation module 163-2, cadence determining module 163-4, metric weighting module 163-5, and/or input mapping data structures 302, as shown in FIG. 1A. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (i.e., orientation of the device).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In other embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- fitness module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 1A, portable multifunction device 100 also includes a keyboard input analysis module 163 for analyzing input received at a virtual keyboard displayed on the touch-sensitive display 112. Keyboard input analysis module 163 optionally includes the following modules (or sets of instructions), or a subset or superset thereof:

- strike zone establishing module for establishing default and adaptive actuation regions (i.e., home and adaptive strike zones) for keys of a virtual keyboard. In some embodiments, the default and adaptive actuation regions are user-specific and are establishing for each distinct user of the device 100. In some embodiments, the default and adaptive actuation regions are also specific to a current format of the virtual keyboard (e.g., current language, keyboard layout (QWERTY or Emoji), etc.).;
- input disambiguation module 163-2 for disambiguating input received at a virtual keyboard using default and adaptive actuation regions;
- cadence determining module 163-4 for monitoring typing inputs received at a virtual keyboard and determining a cadence based on characteristics of the typing inputs (e.g., based on speed of the typing inputs, force associated with each typing input, locations of the typing inputs, and the like);
- metric weighting module 163-5 for weighting metrics that are associated with the default and adaptive actuation regions based at least in part on typing cadence for a current user of the device 100; and
- input mapping data structures 302.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) includes event sorter 170 (e.g., in operating system 126) and a respective application 136-1 selected from among the applications 136 of portable multifunction device 100 (FIG. 1A) (e.g., any of the aforementioned applications stored in memory 102 with applications 136).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from portrait to landscape, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any remain active for the hit view, continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof is optionally utilized as inputs corresponding to sub-events which define an event to be recognized.

Figure 1C:
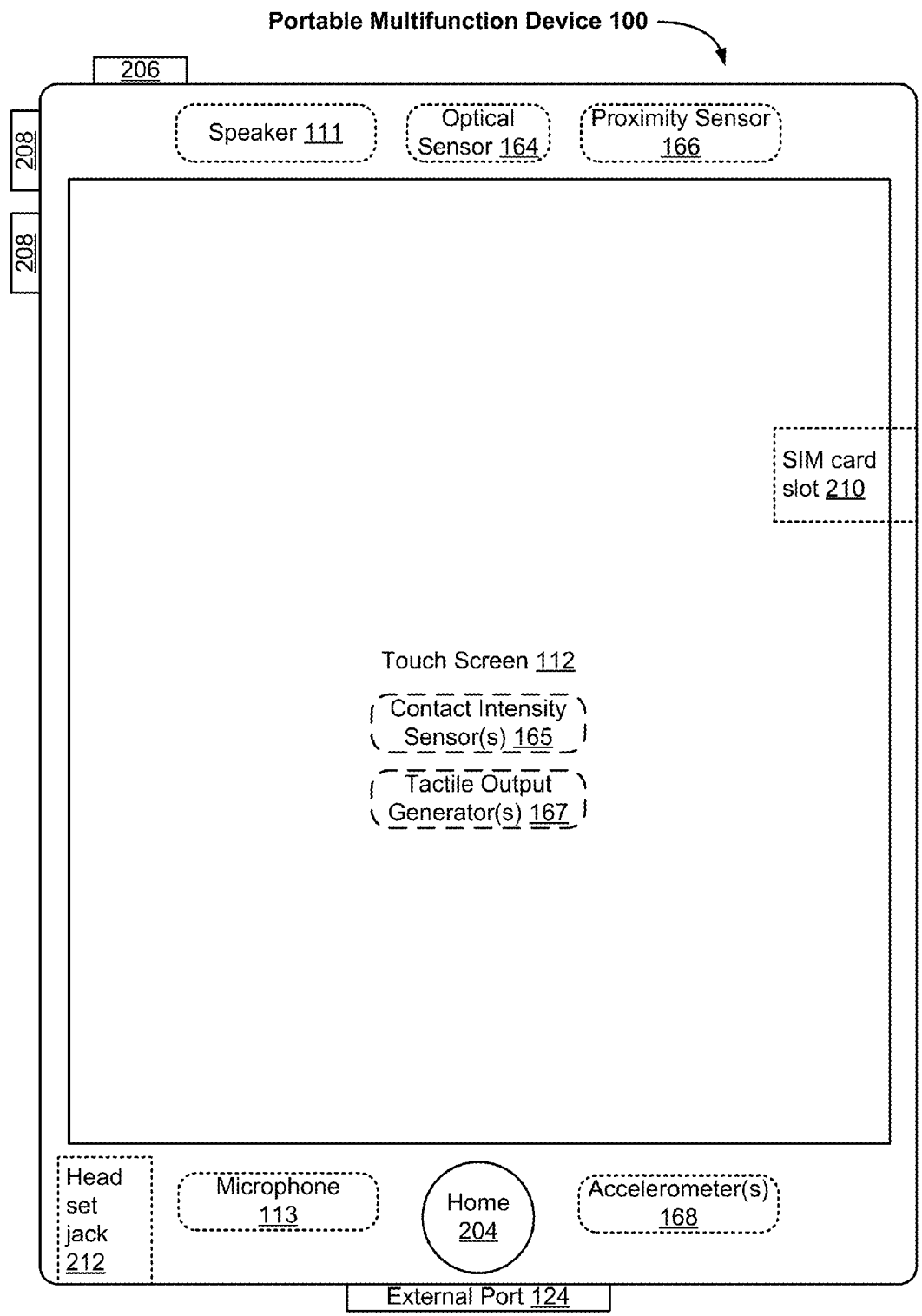
FIG. 1C is a schematic of a portable multifunction device having a touch-sensitive display, in accordance with some embodiments.

FIG. 1C is a schematic of a portable multifunction device (e.g., portable multifunction device 100) having a touch-sensitive display (e.g., touch screen 112) in accordance with some embodiments. In some embodiments, as well as others described below, a user can select one or more graphics displayed on the touch-sensitive display by making a gesture on the screen, for example, with one or more fingers or one or more styluses. In some embodiments, selection of one or more graphics occurs when the user breaks contact with the one or more graphics (e.g., by lifting a finger off of the screen). In some embodiments, the gesture optionally includes one or more tap gestures (e.g., a sequence of touches on the screen followed by liftoffs), one or more swipe gestures (continuous contact during the gesture along the surface of the screen, e.g., from left to right, right to left, upward and/or downward), and/or a rolling of a finger (e.g., from right to left, left to right, upward and/or downward) that has made contact with device 100. In some implementations or circumstances, inadvertent contact with a graphic does not select the graphic. For example, a swipe gesture that sweeps over an application affordance (e.g., an icon) optionally does not launch (e.g., open) the corresponding application when the gesture for launching the application is a tap gesture.

Device 100 optionally also includes one or more physical buttons, such as a "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 1D is a schematic used to illustrate a user interface on a device (e.g., device 100, FIG. 1A) with a touch-sensitive surface 195 (e.g., a tablet or touchpad) that is separate from the display 194 (e.g., touch screen 112). In some embodiments, touch-sensitive surface 195 includes one or more contact intensity sensors (e.g., one or more of contact intensity sensor(s) 359) for detecting intensity of contacts on touch-sensitive surface 195 and/or one or more tactile output generator(s) 357 for generating tactile outputs for a user of touch-sensitive surface 195.

Although some of the examples which follow will be given with reference to inputs on touch screen 112 (where the touch sensitive surface and the display are combined), in some embodiments, the device detects inputs on a touch-sensitive surface that is separate from the display, as shown in FIG. 1D. In some embodiments the touch sensitive surface (e.g., 195 in FIG. 1D) has a primary axis (e.g., 199 in FIG. 1D) that corresponds to a primary axis (e.g., 198 in FIG. 1D) on the display (e.g., 194). In accordance with these embodiments, the device detects contacts (e.g., 197-1 and 197-2 in FIG. 1D) with the touch-sensitive surface 195 at locations that correspond to respective locations on the display (e.g., in FIG. 1D, 197-1 corresponds to 196-1 and 197-2 corresponds to 196-2). In this way, user inputs (e.g., contacts 197-1 and 197-2, and movements thereof) detected by the device on the touch-sensitive surface (e.g., 195 in FIG. 1D) are used by the device to manipulate the user interface on the display (e.g., 194 in FIG. 1D) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touch-sensitive surface 195 in FIG. 1D (touch-sensitive surface 195, in some embodiments, is a touchpad)) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch-sensitive display) will indicate that the user is intending to activate the respective button (as opposed to other user interface elements shown on a display of the device).

Attention is now directed towards user interface ("UI") embodiments and associated processes that may be implemented on an electronic device with a display and a touch-sensitive surface, such as device 100.

FIG. 2 is a schematic of a touch screen used to illustrate a user interface for a menu of applications, in accordance with some embodiments. Similar user interfaces are, optionally, implemented on device 100 (FIG. 1A). In some embodiments, the user interface for the menu of applications includes the following elements, or a subset or superset thereof:

Signal strength indicator(s) 202 for wireless communication(s), such as cellular and Wi-Fi signals;
Time 203;
Bluetooth indicator 205;
Battery status indicator 206;
Tray 209 with icons for frequently used applications, such as:
  Icon 216 for telephone module 138, labeled "Phone," which optionally includes an indicator 214 of the number of missed calls or voicemail messages;
  Icon 218 for e-mail client module 140, labeled "Mail," which optionally includes an indicator 210 of the number of unread e-mails;
  Icon 220 for browser module 147, labeled "Browser;" and
  Icon 222 for video and music player module 152, also referred to as IPOD (trademark of APPLE Inc.) module 152, labeled "iPod;" and
Icons for other applications, such as:
  Icon 224 for IM module 141, labeled "Messages;"
  Icon 226 for calendar module 148, labeled "Calendar;"
  Icon 228 for image management module 144, labeled "Photos;"
  Icon 230 for camera module 143, labeled "Camera;"
  Icon 232 for online video module 155, labeled "Online Video"
  Icon 234 for stocks widget 149-2, labeled "Stocks;"
  Icon 236 for map module 154, labeled "Maps;"
  Icon 238 for weather widget 149-1, labeled "Weather;"
  Icon 240 for alarm clock widget 149-4, labeled "Clock;"
  Icon 242 for fitness module 142, labeled "Fitness;"
  Icon 244 for notes module 153, labeled "Notes;"
  Icon 246 for a settings application or module, which provides access to settings for device 100 and its various applications; and
  Other icons for additional applications, such as App Store, iTunes, Voice Memos, and Utilities.

It should be noted that the icon labels illustrated in FIG. 2 are merely exemplary. Other labels are, optionally, used for various application icons. For example, icon 242 for fitness module 142 is alternatively labeled "Fitness Support," "Workout," "Workout Support," "Exercise," "Exercise Support," or "Health." In some embodiments, a label for a respective application icon includes a name of an application corresponding to the respective application icon. In some embodiments, a label for a particular application icon is distinct from a name of an application corresponding to the particular application icon.

FIGS. 3A-3B are block diagrams illustrating data structures for storing mapping information about inputs received at a virtual keyboard, in accordance with some embodiments. As shown in FIG. 3A, input mapping data structures 302 include a collection of data structures 302, optionally implemented as a collection of tables for each particular user of the device 100, that each store input mapping data associated with a particular user of the device 100 (e.g., input mapping data structure 302-1 stores input mapping data associated with user 1 of the device 100 (e.g., user with an ID of A_Jones123) and input mapping data structure 302-2 stores input mapping data associated with user 2 of the device 100). In some embodiments, each table (e.g., table 302-1, 302-2, 302-3 . . . 302-N) in the collection of input mapping data structures stores input mapping information for more than one user of the device.

In some embodiments, one or more input mapping data structures 302 (e.g., input mapping data structure 302-1, FIG. 3B) are used for storing input mapping data associated with a user of the device 100. As illustrated in FIG. 3B, input mapping data structure 302-1 contains data (e.g., input map ID, device ID, keyboard type ID, user ID, input coordinates, actuated key, and predicted word IDs) associated with input mapping data for user 1. In some embodiments, the data is stored in individual records 312-1, 312-2, 312-3 through 312-N. In some embodiments, a header field 312-0 is used to describe each field of information associated with each of the respective records. Header 312-0, in some embodiments, contains a brief description of each field of information (e.g., each field associated with each of the records) stored within the table. As shown in FIG. 3B, header 312-0 indicates that each record 312-1, 312-2, 312-3 through 312-N stores the following information and data structures, or a subset or superset thereof, for each respective input received at a virtual keyboard:

a value for an "input map ID" field that uniquely identifies each particular record or information about each particular individual input received at the virtual keyboard (e.g., records 312-1 through 312-N);
a value for a "device ID" field that corresponds to an identifier for the device at which the input was received;
a value for a "keyboard type ID" field that corresponds to an identifier of the type of virtual keyboard displayed (e.g., language information, emoji or QWERTY, and the like) when the input was received;
a value for a "user ID" field that identifies a user of the device when the input was received (e.g., based on current login credentials or based on current typing cadence as discussed in more detail below);
a value for an "input coordinates" field that includes coordinates, relative to the touch-sensitive display, of a position on the touch-sensitive display at which the input was received;
a value for an "actuated key" field that corresponds to information about a key that was actuated based on the received input; and
a value for a "predicted word IDs" field.

In some embodiments, input mapping data structure 302-1 includes fields in addition to the fields described above, such as a timestamp field that identifies when a respective input was received at the virtual keyboard and/or a related inputs field that includes one or more input map IDs corresponding to inputs received at or around the same time as the input associated with a particular record.

As shown in FIG. 3B, the input mapping data structure 302-1 includes records 312-1, 312-2, 312-3 through 312-N.

As one example of the information stored in an example record in the input mapping data structure 302-1, record 312-1 stores a value of "1" in the input map ID field, a value of "A's iPad Air 2" in the device ID field, a value of "1" in the keyboard type ID field, a value of "A_Jones123" in the user ID field, a value of "{50 px, 1000 px}" in the input coordinates field, a value of "Q" in the actuated key field, and a value of "{12, 87, 34} in the predicted word IDs field.

In some embodiments, the information included in each input mapping data structure 302 is used to construct input maps that reflect all inputs received at a virtual keyboard for a particular user of the device 100. In some embodiments, all records associated with a particular user and a particular keyboard type ID are retrieved from a particular input mapping data structure and the input map is constructed based off of the input coordinate data in the retrieved records. For example, FIG. 5A illustrates inputs 520 each displayed as small, substantially circular markings on the surface of the virtual keyboard 502. In some embodiments, the constructed input maps are analyzed by keyboard input analysis module 163 in order to establish default and adaptive actuation regions (default and adaptive actuation regions are discussed in more detail below in reference to FIGS. 5A-5L and 6-7).

Although illustrated as a particular implementation of a data structure (e.g., a table), the data structures of FIGS. 3A-3B, in some embodiments, are implemented in XML files, tables within a relational database, text files, and/or any other suitable format for storing data.

FIG. 4 is a block diagram illustrating an exemplary keyboard input disambiguation system, in accordance with some embodiments. As shown in FIG. 4, a keyboard input disambiguation system 400 includes the portable multifunction device 100 and also includes one or more servers 402. The portable multifunction device 100 communicates with the one or more servers 402 over one or more networks. The one or more networks (e.g., network(s) 420) communicably connect each component of the keyboard input disambiguation system 400 with other components of the keyboard input disambiguation system 400. In some embodiments, the one or more networks 420 include public communication networks, private communication networks, or a combination of both public and private communication networks. For example, the one or more networks 520 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, one or more input mapping data structures 302 are stored on the portable multifunction device 100 and one or more other input mapping data structures 302 are stored on the one or more servers 402. In some embodiments, the portable multifunction device 100 stores the input mapping data structures 302, while in other embodiments, the one or more servers 402 store the input mapping data structures 302.

In embodiments in which one or more input mapping data structures 302 are stored on the one or more servers 402, then some of functions performed by the keyboard input analysis module 163 (and the components thereof) are performed at the one or more servers 402. In these embodiments, information is exchanged between the one or more servers 402 and the device 100 over the networks 420. For example, if the one or more servers 402 store input mapping data structures 302 for a first user's inputs at a virtual keyboard on a second device that is distinct from the device 100, then, in some embodiments, the device 100 sends data (e.g., one or more records 312, FIG. 3B) associated with the first user's inputs at a virtual keyboard (e.g., keyboard 502 discussed below in reference to FIGS. 5A-5L and 6-7) at the device 100 to the one or more servers 402. In some embodiments, the one or more servers 402 then construct combined input maps that incorporate coordinate data from the inputs received at both the device 100 and the second device. In this way, the constructed inputs maps can be created based on data about received inputs at multiple devices that are each associated with the same user.

In some embodiments, the one or more servers 402 act as a repository for storing data about inputs received at a plurality of devices associated with the same user and that data is then communicated to a device that the user is currently interacting with (e.g., device 100) in order to construct combined input maps at the device instead of at the one or more servers 402.

In some embodiments, any data that is sent to the one or more servers 402 is of limited scope, such that it contains only information pertaining to the first user (the user may also configure privacy settings that cover the collection of this data and these privacy settings and, in some embodiments, the user is able to control, limit, or eliminate the exchange of data with the one or more servers 402).

FIGS. 5A-5C are schematics of a touch screen (e.g., touch-sensitive display 112) used to illustrate default and adaptive actuation regions based on locations of input at an onscreen keyboard, in accordance with some embodiments. FIG. 5A illustrates a virtual/onscreen keyboard 502 that is displayed on a touch-sensitive display 112 of device 100. As discussed above, information stored in one or more input mapping data structures 302 (FIGS. 3A-3B) can be used to construct maps that show locations for input received at the virtual keyboard 502 from a particular user. In some embodiments, the constructed map may be overlaid on top of the virtual keyboard 502, while in other embodiments, the constructed map is stored and processed in memory and is not displayed on the touch-sensitive display 112.

In some embodiments or circumstances, users hit different keys in different locations relative to the key center, and these locations are not typically the same from key to key (as shown in FIG. 5A, input dots 520 representing a particular received input proximate to each key have varying patterns relative to the center of each respective key). Turning now to FIG. 5A, each input (i.e., inputs associated with an input map constructed using data from the input mapping data structures 302) is shown or represented as a substantially circular dot 520 (e.g., dots 520-1 and 520-2, FIG. 5A). FIG. 5A also illustrates default actuation region 518-1 that is associated with "Z" key and default actuation region 518-2 that is associated with "O" key. As shown in FIG. 5A, the default actuation regions include most of the displayed boundaries of a respective key (e.g., default actuation region 518-1 includes most of the displayed area for the visual boundaries 514-1 for the Z key).

In some embodiments, the probability of each key (i.e., the probability that each key is an intended target of a received input at the virtual keyboard) is represented using a Gaussian curve that is centered on a respective midpoint of a defined strike zone (e.g., a default or an adaptive actuation region). In some embodiments, both the probability and the geometric center of this defined strike zone may change according to how the user is typing. In some embodiments, two types of strike zones (also referred to herein as "actuation regions") are defined: default and adaptive actuation regions. Home strike zones (i.e., default actuation regions)

are the strike zones that are initially positioned so that they are centered on a visual/displayed center of a key. Adaptive Strike Zones (i.e., adaptive actuation regions) are the strike zones that are initially positioned so that they are centered on the geometric average of the locations where the user statistically hits each key. As discussed in more detail below in reference to FIGS. 5D-5L, some embodiments allow for moving respective initial positions of adaptive and home actuation regions in response to movement of a user's hands or fingers across the keyboard 502.

In some embodiments or circumstances, the input disambiguation module 163-2 may first associate a particular typing input with a first key, but that association may change based on user input (e.g., a user deletes and replaces a character associated with the first key with some other character associated with a different key) and/or based on autocorrect changes made to words as a user is typing. In some embodiments, a feedback loop is utilized so the keyboard input analysis module 163 (FIG. 1A) is informed when user input or autocorrect has changed a letter, and the feedback loop allows the device 100 (or a component thereof, such as strike zone establishing module 163-1) to modify default and adaptive actuation regions accordingly. In some embodiments, for the feedback loop data to be accepted (and then used to modify default and adaptive actuation regions), the candidate replacement key should be adjacent to the original key determined by the keyboard analysis module 163 (otherwise, in some embodiments, the feedback loop data may be rejected). For example, if a user incorrectly types the word "recieve" and autocorrect fixes it to say "receive", then default and adaptive actuation regions for "E" and "I" keys may not be adjusted at all, because the "E" and "I" keys are not adjacent to one another.

In some embodiments, if the user looks down at the keyboard and makes a deliberate and accurate tap anywhere in the visual boundary of a key, that key should be typed. For example, an adaptive actuation region 516-4 for the letter "E" in FIG. 5C, may actually exclude a portion of the left half of the "E" key in favor of that location being assigned to the "W" key's adaptive actuation region 516-3. But if the user intentionally takes their time and taps on the left half of the "E" key (e.g., input 520-3 within default actuation region for the "E" key and within adaptive actuation region for the "W" key), the letter "E" should be determined as the intended keystroke (not the letter "W"). In some embodiments, typing cadence is utilized to determine when to give more weight to an adaptive actuation region and when to give more weight to a default actuation region.

In some embodiments, a cadence determining module 163-4 monitors the typing speed and rhythm of the user to determine what is normal for them. Then, if the user is typing within a reasonable match with respect to their previously stored typing cadence (e.g., they are typing within 4-5 words per minute of their normal typing cadence), stronger emphasis is put on the adaptive actuation regions. In accordance with a determination that, on the other hand, the user has broken from their usual typing cadence and seems to have slowed down to type a particular key, stronger emphasis is placed on default actuation regions. Additional details regarding use of metrics (and weighting of the metrics) to help disambiguate inputs are provided below in reference to method 700 and FIG. 7.

In some embodiments, respective adaptive actuation regions are centered based on a respective K-Means center of a predefined number of taps (e.g., 10, 15, 20, or 25) on a respective key within one standard deviation of the displayed center of that respective key. In some embodiments, a size and shape of a particular adaptive actuation region is an oval that encompasses all taps within one standard deviation of the current sample set of inputs for a key that is associated with the particular adaptive actuation region. In some embodiments, two radiuses of this oval-shaped adaptive actuation region as well as the rotation of the oval is calculated to get the smallest area that encompasses all touches within the standard deviation. Example adaptive actuation regions are shown on FIG. 5B for each respective key (e.g., adaptive actuation region 516-1 encompasses inputs for the Z key and adaptive actuation region 516-2 encompasses inputs for the O key).

In some embodiments, strike zone definitions remain fluid, adapting as the oldest tap is dropped from the calculation/definition of a respective actuation region and newest taps are added in as part of the calculation/definition of the respective actuation region. In some embodiments, an adaptive actuation region needs to have a predetermined minimum number of valid taps (e.g., 2, 3, or 4) associated with a corresponding key to begin morphing (i.e., changing its shape as old taps are replaced with newer taps).

In some embodiments, adaptive actuation regions incorporate inputs received from a number of various users, while in other embodiments, adaptive actuation regions are specific to each individual user of the device 100. In some embodiments, users are identified based on a combination of typing parameters associated with each particular user and that uniquely identify each particular user (speed, strike zones, cadence, touch signals from capacitive touch sensors, vibration signals accelerometers, force signals from pressure sensors, etc.).

In some embodiments, two or more distinct sets of adaptive actuation regions are maintained on the device 100, one for an owner of the device (i.e., the predominant user of the device) and one for a guest user of the device. In this way, the device 100 need only determine whether the owner is using the device or whether someone else is currently using the device, to decide which set of adaptive actuation regions to retrieve and use to help disambiguate typing inputs.

In some embodiments, while constructing input maps such as those shown on keyboard 502 of FIGS. 5A-5C, different shapes are assigned to adjacent keys to distinguish which key each heatmap dot belongs to. In some embodiments, two alternating shapes/character pairs are utilized for keys on common rows, and then different pairs for keys on different rows, for example:

| Row | Heatmap Markers |
| --- | --- |
| 1 (top row, qwerty) | Δ and x |
| 2 (asdf) | · and $ |
| 3 (zxcv) | ◇ and + |
| 4 (space row) | ■ and @ |

In some embodiments, in addition to modifying shapes of adaptive actuation regions, the device 100 (or a component thereof, such as strike zone establishing module 163-1) monitors positions of a user's hands and figures with respect to the keyboard 502, so that positions of default and adaptive actuation regions may be moved in response to movement of the user's hands and fingers. FIGS. 5D-5L are schematics of a user interface (e.g., displayed on touch-sensitive display 112) that includes a keyboard 502 with default actuation regions that are moved in response to movement of a user's hands or individual fingers across the keyboard 502, in accordance with some embodiments.

In some embodiments, to help account for changing hand/finger positions while a user types, the keyboard 502 (or the adaptive and default actuation regions associated therewith) is logically divided into left and right halves. In some embodiments, left and right halves of the keyboard 502 are logically grouped and then default actuation regions within each of those groups are moved in response to detecting movement of a user's hand or fingers drifting on the keyboard 502. In some embodiments, only default and/or adaptive actuation regions that are associated with alphanumeric keys are moved in response to detecting drift and, in these embodiments, default and/or adaptive actuation regions associated with non-alphanumeric keys (to the extent that default and adaptive actuation regions are defined for non-alphanumeric keys) are not moved (e.g., return, shift, delete, and tap keys).

Figure 5F:
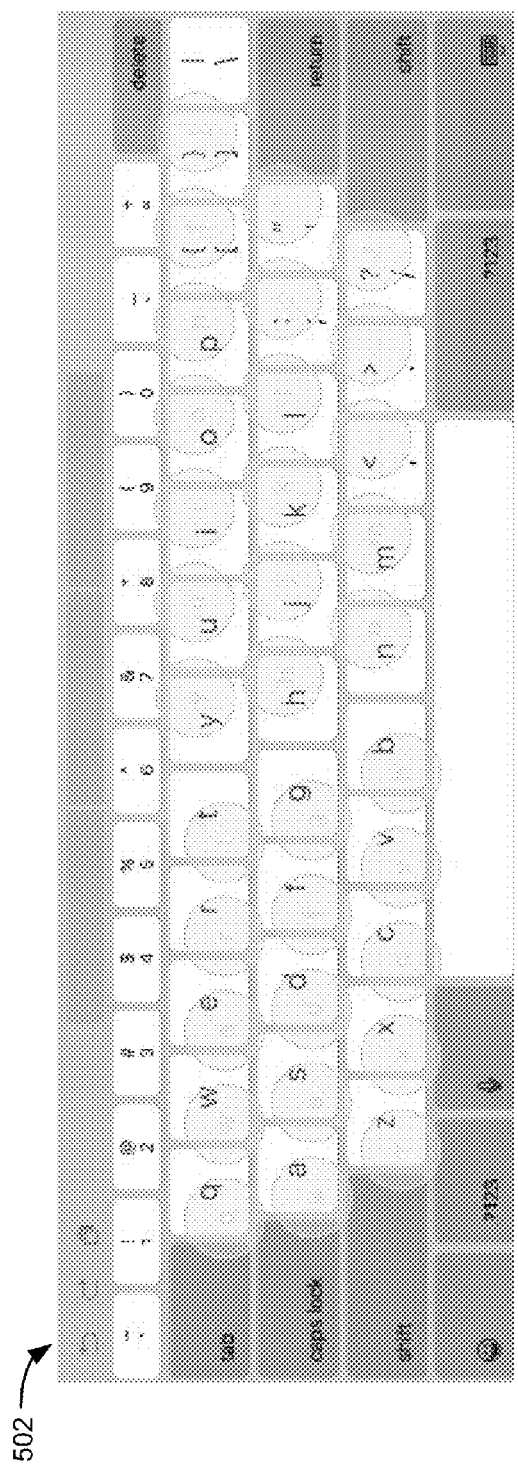

In some embodiments, default actuation regions that are associated with keys that do not border an edge of the keyboard 502 are moveable (i.e., default actuation regions associated with some symbol keys may be moveable, as shown in FIG. 5F). In this way, the keyboard 502 is able to continue occupying a full width of the touch-sensitive display 112 and movement of default actuation regions associated with alphanumeric keys is possible because the non-alphanumeric keys (or any default actuation regions associated therewith are not moved (i.e., the default actuation regions for the alphanumeric keys are able to move on top of the non-alphanumeric keys, as shown in FIGS. 5D-5E). In some embodiments, each default actuation region is moved to respective new positions, in response to detected drift of user's hands and/or fingers, and the respective new positions are no more than a predefined distance away relative to a midpoint of a respective previous position for each default actuation region. For example, the predefined distance is a distance that corresponds to half of a width of a displayed key.

As an example, FIG. 5D shows that default actuation regions are initially aligned with visible, displayed positions of keys on the keyboard 502. In response to detecting movement of a user's left hand during typing, each default actuation region associated with those keys that are grouped in a first grouping of keys (a left-side grouping that includes keys "q," "w," "e," "r," "t," "a," "s," "d," "f," "g," "z," "x," "c," "v," and "b") is moved in accordance with the detected movement (as shown in FIG. 5E).

As shown in FIG. 5F, if additional movement of the user's right hand is then detected, in response to detecting that additional movement (after already having detected movement of the left hand), each default actuation region associated with those keys that are grouped in a second grouping of keys (a right-side grouping that includes keys "y," "u," "i," "o," "p," "h," "j," "k," "l," "n," and "m") is moved in accordance with the detected additional movement. In some embodiments, the second grouping of keys includes symbol keys that do not contact an edge of the keyboard 502 (such as "{," "}," and ":" as shown in FIG. 5F, and default actuation regions associated with these symbol keys are also moved in response to detecting drift of the user's right hand across the keyboard 502.

FIGS. 5E and 5F illustrate examples in which a user's left or right hand moves its position on the keyboard 502 and, thus, all keys associated with respective first and second groups are shifted accordingly. In some embodiments, movement or drift of one or more fingers also causes movement of one or more associated keys (i.e., only those default actuation regions associated with keys on which the one or more fingers were placed are moved, without having to move all default actuation regions in a particular group).

Figure 5G:
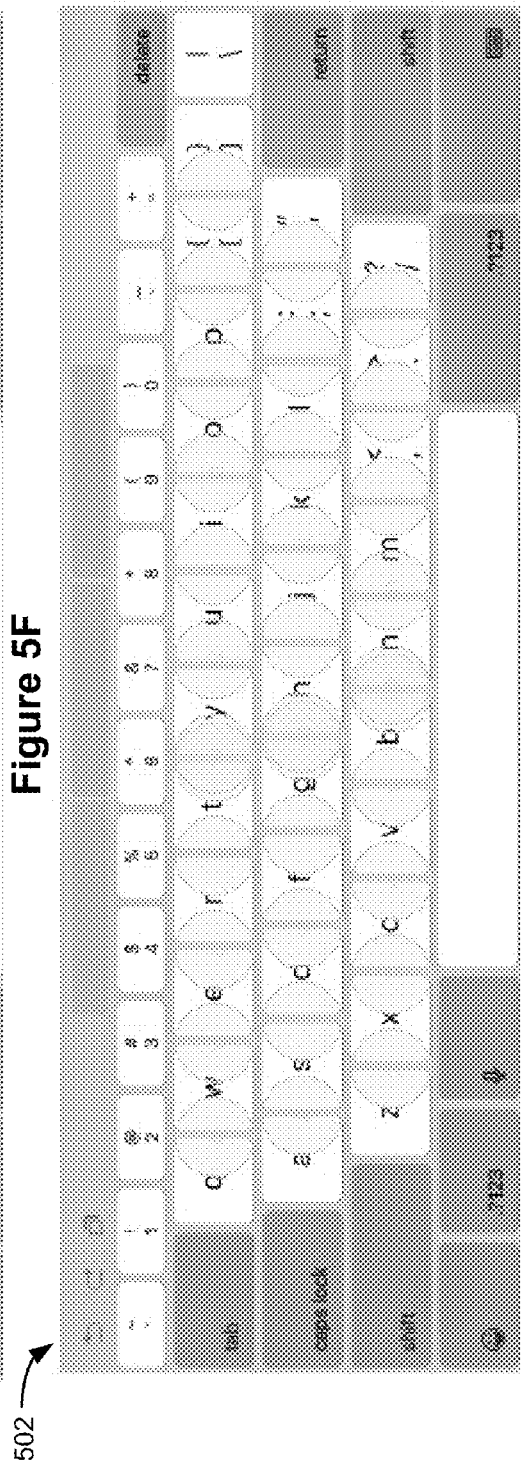
Figure 5H:
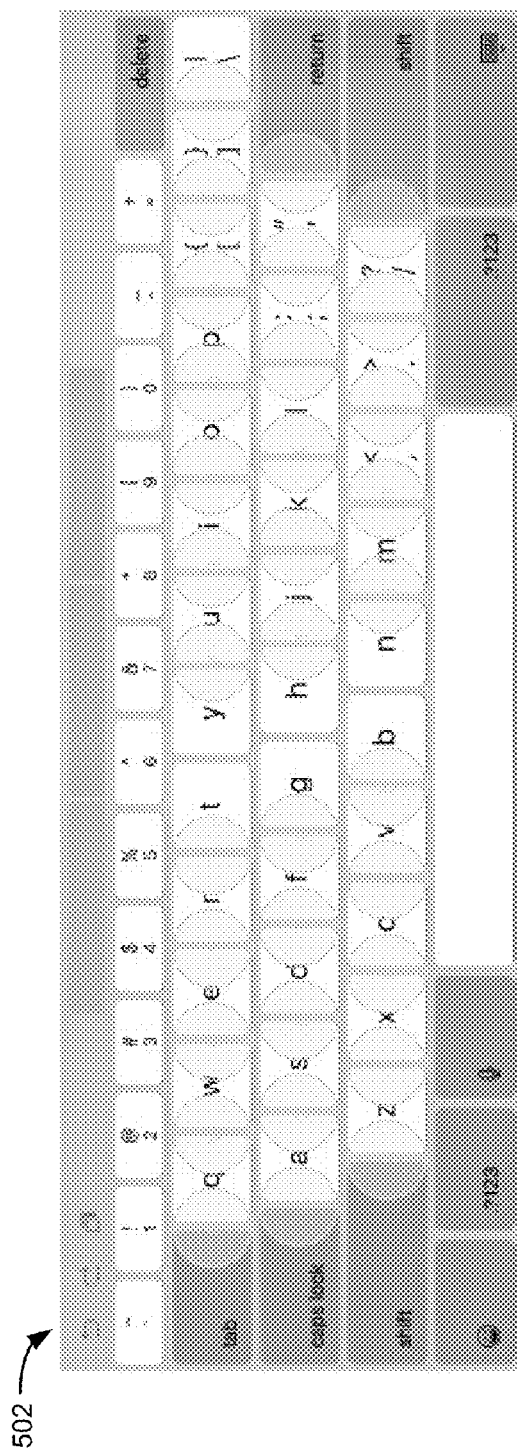
Figure 5I:
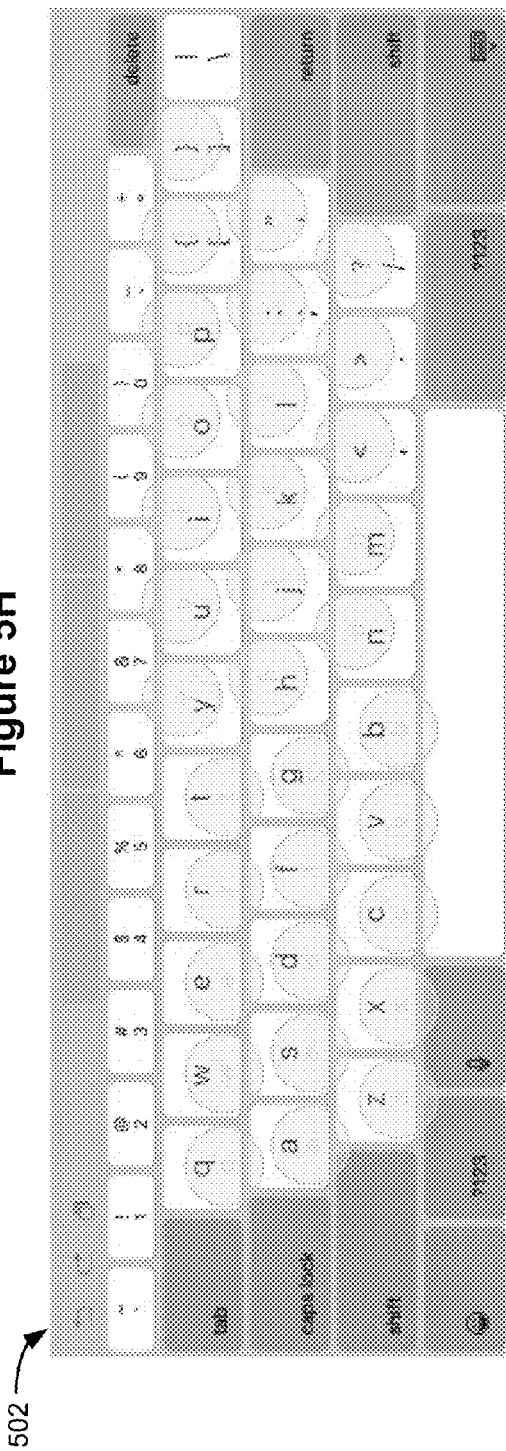

In some embodiments or circumstances, a user's movement of their right and left hands may cause default actuation regions to overlap with other default actuation regions (e.g., as shown in FIG. 5G, if both hands move towards a midpoint of the keyboard 502, then moving default actuation regions for each of the first and second groups of keys may create some overlap, such as overlapping default actuation regions for the "t" and "y" keys) or with other displayed keys that may not be associated with default actuation regions (e.g., as shown in FIG. 5H, a default actuation region for the "q" key overlaps the displayed "tab" key and, as shown in FIG. 5I, the "y" key may overlap a portion of a "6" and a "7" key). In some embodiments, when a user then types within a region of the keyboard 502 that is affected by this overlap, an autocorrect engine of the device 100 is utilized to help determine an intended keystroke.

In some embodiments, incorrect determinations of intended keystrokes may also provide feedback to the user to move their hands to a different position. In some embodiments, the device 100 may also provide an audible warning, haptic feedback, and/or a visual cue to alert the user that their hand and/or finger positions have drifted too far. In some embodiments, when a user moves their hands to the different position, the device 100 (or a component thereof) responds by moving positions of default actuation regions accordingly.

In some embodiments, users are also able to reset the positions of default actuation regions back to their initial positions. In some embodiments, pauses in typing and set-down events cause the device 100 to reset positions of the default actuation regions. For example, in accordance with a determination that a user has stopped typing for a predetermined amount of time (e.g., for more than 3, 4, or 5 seconds), then each default actuation region may reset to its initial position (e.g., those positions shown in FIG. 5D). Alternatively or in addition, in accordance with a determination that a user has performed a set-down (e.g., the user repositions their hands so that "f" and "j" keys are located underneath the user's forefingers), the device 100 may then reset each default actuation region to its initial position (e.g., those positions shown in FIG. 5D).

In some embodiments, if the user repositions their hands so that their forefingers are outside of a predetermined distance from a midpoint of "f" and "j" keys (e.g., the predetermined distance may correspond to a distance of a width of half of a displayed key on the keyboard 502), then each default actuation region may be reset to a position other than a respective initial position. For example, if a user is typing and has moved both of their hands towards a midpoint of the keyboard 502, then the default actuation regions may be positioned as shown in FIG. 5G and, in response to the user pausing for more than the predetermined amount of time discussed above and then repositioning their hands to separate them relative to the midpoint of the keyboard 502, then the default actuation regions may be reset to positions such as those shown in FIG. 5E or 5F.

Figure 5J:
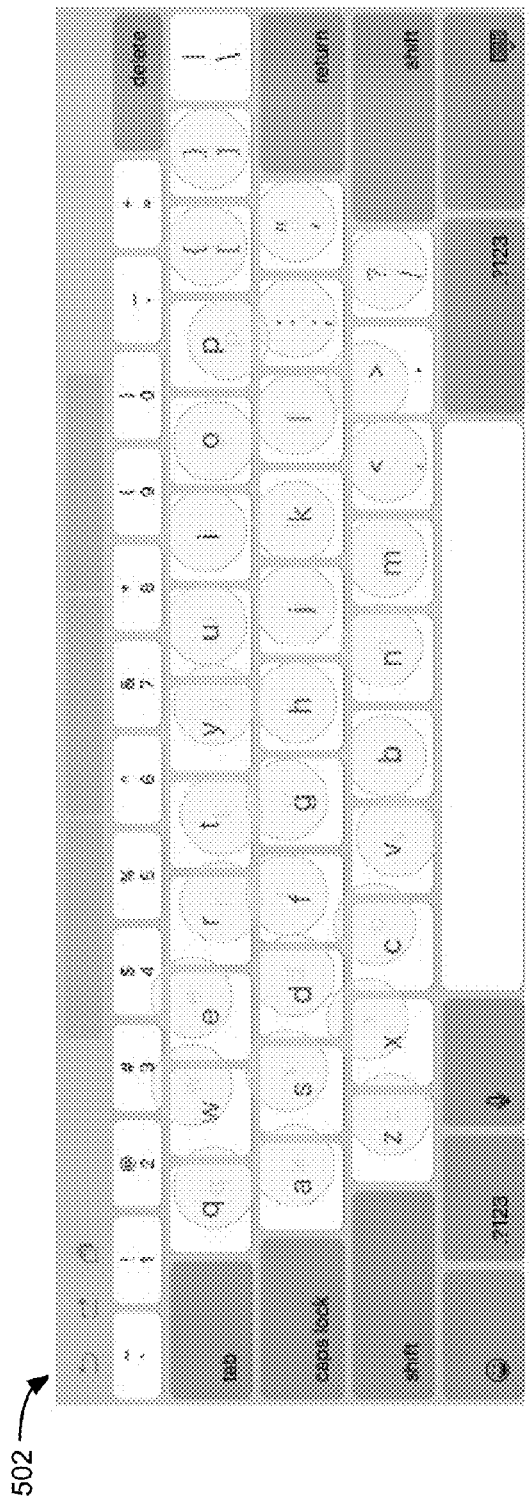
Figure 5K:
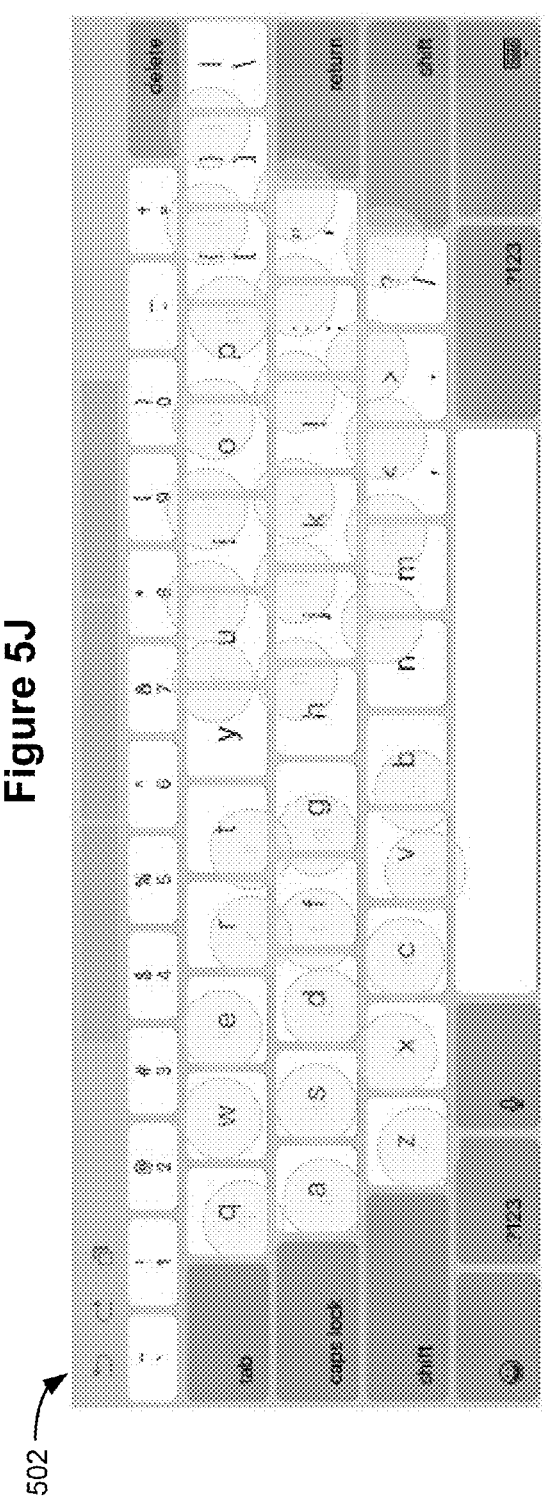

In some embodiments, respective default actuation regions are positioned so that they capture where a user most often types each respective key (as discussed above in reference to FIGS. 3A-3B and 5A-5C). For example, FIG. 5J shows example positions of respective default actuation regions for each key of the keyboard 502, in which initial positions for the respective default actuation regions capture where a user most often types each respective key (i.e., the initial positions are other than those shown in FIG. 5D, because the user's typing patterns have caused the device 100 to shift/update the initial positions to accurately capture where a user most often types each respective key). FIG. 5K also shows that after initial positions for default actuation regions have been shifted/updated to account for user-specific typing patterns, then the first and second groups of keys may still drift to account for movement of a user's hands or individual fingers while typing (e.g., as shown in FIG. 5K, as a user moves their left hand down and to the left, default actuation regions corresponding to the first group of keys are shifted accordingly and, as a user moves their right hand up and to the right, default actuation regions corresponding to the second group of keys are shifted accordingly as well).

FIG. 6 is a flowchart depicting a method 600 of disambiguating intended user input at a virtual keyboard using dual strike zones, in accordance with some embodiments. FIGS. 3A-3B, 4, and 5A-5K are used to illustrate the methods and/or processes of FIG. 6. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 600 is performed by an electronic device (e.g., portable multifunction device 100, FIG. 1A) and/or one or more components of the electronic device (e.g., I/O subsystem 106, operating system 126, etc.). In some embodiments, the method 600 is governed by instructions that are stored in a non-transitory computer-readable storage medium and that are executed by one or more processors of a device, such as the one or more processors 122 of device 100 (FIG. 1A). For ease of explanation, the following describes method 600 as performed by the device 100. In some embodiments, with reference to FIG. 1A, the operations of method 600 are performed by or use, at least in part, a keyboard input analysis module (e.g., keyboard input analysis module 163), input mapping data structures (e.g., input mapping data structures 302), a strike zone establishing module (e.g., strike zone establishing module 163-1), an input disambiguation module (e.g., input disambiguation module 163-2), a cadence determining module (e.g., cadence determining module 163-4), a metric weighting module (e.g., metric weighting module 163-5), and a touch-sensitive display (e.g., touch-sensitive display system 112). Some operations in method 600 are, optionally, combined and/or the order of some operations is, optionally, changed.

As described below, the method 600 provides improved typing accuracy and resolution of intended user input at a virtual keyboard on an electronic device with a touch-sensitive display. By improving typing accuracy, method 600 helps to extend the life of the touch-sensitive display by requiring a fewer number of touch inputs (e.g., by eliminating the need for users to repeatedly interact with the device in order to correct spelling errors) and improve users' satisfaction with their devices.

In some embodiments, a method 600 includes: establishing (602) a plurality of default actuation regions (also referred to as home strike zones) for a virtual keyboard, each respective default actuation region associated with a respective key of a plurality of keys on the virtual keyboard. An example plurality of default actuation regions (e.g., substantially circular regions associated with each respective key on the virtual keyboard, such as default actuation region 518-1 associated with the "Z" key) are pictured in FIG. 5A. In some embodiments, the default actuation regions are centered on the displayed center of a respective key and are not related to typing inputs received for that respective key (i.e., only the displayed location of the key (and movement of a user's hands or fingers, as discussed above with reference to FIGS. 5A-5K) affects the location of the default actuation region).

In some embodiments, the method further includes: providing (604) a plurality of adaptive actuation regions (also referred to as adaptive strike zones) for the virtual keyboard, each respective adaptive actuation region associated with a region of the touch-sensitive display within which a predetermined number (e.g., 5, 10, 15, or 20) of previous typing inputs have been received for a single key of the plurality of keys of the virtual keyboard. FIG. 5B illustrates an example plurality of adaptive actuation regions for each respective key on the virtual keyboard. For example, adaptive actuation region 516-2, associated with the O key, includes the predetermined number of previous typing inputs received for the O key.

In some embodiments, providing the plurality of adaptive actuation regions includes retrieving stored adaptive actuation regions that are associated with a current user of the electronic device (e.g., by retrieving records from one or more input mapping data structures 302, FIGS. 3A-3B, that are stored on the device 100 or on one or more servers 502, FIG. 4). In some embodiments, the retrieved stored adaptive actuation regions are established through a machine learning exercise/process/algorithm. For example, by presenting the virtual keyboard and a series of letters to type at the virtual keyboard and then generating the adaptive actuation regions based on the locations at which each letter was typed during the machine learning exercise/process/algorithm. In some embodiments, the machine learning exercise/process is conducted during an initial startup of the electronic device and for each new user of the electronic device.

In some embodiments, the method also includes: receiving (606), at the virtual keyboard, a sequence of new typing inputs (e.g., keys typed by a user while typing a text message or email response) with an observed cadence, the sequence of new typing inputs including an ambiguous typing input that is within a first adaptive actuation region associated with a first key and is within a first default actuation region associated with a second key. For example, typing input 520-2 is within an adaptive actuation region 516-2 associated with the "O" key and is also within a default actuation region 518-3 associated with the "P" key (FIG. 5C).

In some embodiments, the observed cadence includes a typing speed, an amount of pressure applied with each typing input of the sequence of new typing inputs, and other typing-related characteristics.

In accordance with a determination that the observed cadence satisfies a cadence threshold (e.g., user is typing quickly, such as at a pace of 50 words per minute or at a pace that is more than 5-10 words per minute greater than the user's normal typing cadence, and possibly with less precision relative to displayed positions of the keys), the method includes determining (608) that the ambiguous typing input is associated with the first key. In other words, adaptive actuation regions are weighted more because the user is typing quickly and, thus, the key associated with adaptive actuation region 516-2 (i.e., the "O" key) is determined to be the intended target of ambiguous typing input 520-2.

In accordance with a determination that the observed cadence does not satisfy the cadence threshold (e.g., the user is typing slowly, such as at a pace of less than 35 words per minute or at a pace that is more than 5-10 words per minute less than the user's normal typing cadence, and is tapping closer to the displayed center of each key), the method includes determining (610) that the ambiguous typing input is associated with the second key. In other words, default actuation regions are weighted more because the user is typing slowly and, thus, the key associated with default actuation region 518-3 (i.e., the "P" key) is determined to be the intended target of ambiguous typing input 520-2.

In some embodiments, the cadence threshold is specifically associated with a current user of the electronic device (i.e., the cadence threshold is specific to the current user and other users are associated with their own cadence thresholds).

In some embodiments, each respective adaptive actuation region of the plurality of adaptive actuation regions is established by identifying a region of the touch-sensitive display that encompasses the predetermined number of previous typing inputs for a respective single key (as discussed above in reference to FIGS. 5A-5K).

In some embodiments, the method 600 further includes: receiving user input requesting to change the virtual keyboard to a new keyboard format and, in response to receiving the user input requesting to change the virtual keyboard to the new keyboard format, providing a new plurality of adaptive actuation regions that are associated with the new keyboard format. For example, the user requests to change from an alphanumeric keyboard to an emoji keyboard and, in response, the device 100 retrieves a new plurality of adaptive actuation regions that are associated with the emoji keyboard. In this way, the device 100 is able to improve typing accuracy for specific types of keyboards, as a user's typing patterns may be different for different types of keyboards.

In some embodiments, the plurality of adaptive actuation regions is a default plurality associated with the electronic device and the method further includes, after detecting the observed cadence, determining a user that is currently typing at the electronic device based at least in part on the observed cadence, and providing a new plurality of adaptive actuation regions that is specifically associated with the determined user. For example, if the device 100 is currently signed into a guest account, then the device 100 may use the default plurality initial and may be able to retrieve a user-specific plurality (i.e., the new plurality) after using the observed cadence to identify a specific user and then retrieving the user-specific plurality for that specific user.

In some embodiments, the plurality of adaptive actuation regions are provided for a predefined subset of the plurality of keys of the virtual keyboard. In some embodiments, the predefined subset corresponds to alphanumeric keys on the virtual keyboard.

In some embodiments, the method includes, after receiving each typing input in the typing inputs, determining an intended key associated with the typing input and updating a respective adaptive actuation region that is associated with the determined intended key. In some embodiments, the method includes: receiving user feedback that changes the determined association for the ambiguous typing input to a new key and, in response to receiving the user feedback that changes the determined association, modifying the adaptive actuation region associated with the new key. Additional details regarding modifying shapes and positions of actuation regions are provided above in reference to FIGS. 5A-5K.

In some embodiments, each respective default actuation region of the plurality of default actuation regions is associated with a respective first metric that provides estimates, based on user input at the virtual keyboard, that a respective key associated with a respective default actuation region is an intended target of the user input. In some embodiments, each respective adaptive actuation region of the plurality of adaptive actuation regions is associated with a respective second metric that provides estimates, based on user input at the virtual keyboard, that a respective single key is an intended target of the user input. In some embodiments, the first metrics and the second metrics are weighted in accordance with a plurality of weighting factors, the plurality of weighting factors including the observed cadence, predicted unigrams and n-grams based on the user input, and whether the electronic device is currently positioned in a substantially flat or a substantially angled position. Additional details regarding the first and second metrics are provided below in reference to method 700 and FIG. 7 (in some embodiments, one or more operations of method 700 are used in conjunction with method 600).

It should be understood that the particular order in which the operations in FIG. 6 have been described is merely one example and is not intended to indicate that the described order is the only order in which the operations could be performed. One of ordinary skill in the art would recognize various ways to reorder the operations described herein.

FIG. 7 is a flowchart depicting a method 700 of disambiguating intended user input at a virtual keyboard using dual strike zones, in accordance with some embodiments. FIGS. 3A-3B, 4, and 5A-5C are used to illustrate the methods and/or processes of FIG. 7. Although some of the examples which follow will be given with reference to inputs on a touch-sensitive display (in which a touch-sensitive surface and a display are combined), in some embodiments, the device detects inputs on a touch-sensitive surface 195 that is separate from the display 194, as shown in FIG. 1D.

In some embodiments, the method 700 is performed by an electronic device (e.g., portable multifunction device 100, FIG. 1A) and/or one or more components of the electronic device (e.g., I/O subsystem 106, operating system 126, etc.). In some embodiments, the method 700 is governed by instructions that are stored in a non-transitory computer-readable storage medium and that are executed by one or more processors of a device, such as the one or more processors 122 of device 100 (FIG. 1A). For ease of explanation, the following describes method 700 as performed by the device 100. In some embodiments, with reference to FIG. 1A, the operations of method 700 are performed by or use, at least in part, a keyboard input analysis module (e.g., keyboard input analysis module 163), input mapping data structures (e.g., input mapping data structures 302), a strike zone establishing module (e.g., strike zone establishing module 163-1), an input disambiguation module (e.g., input disambiguation module 163-2), a cadence determining module (e.g., cadence determining module 163-4), a metric weighting module (e.g., metric weighting module 163-5), and a touch-sensitive display (e.g., touch-sensitive display system 112). Some operations in method 700 are, optionally, combined and/or the order of some operations is, optionally, changed.

As described below, the method 700 provides improved typing accuracy and resolution of intended user input at a virtual keyboard on an electronic device with a touch-sensitive display. By improving typing accuracy, method 700 helps to extend the life of the touch-sensitive display by requiring a fewer number of touch inputs (e.g., by eliminating the need for users to repeatedly interact with the device in order to correct spelling errors) and improves users' satisfaction with their devices.

In some embodiments, a method 700 includes: establishing (702) a plurality of default actuation regions (i.e., home strike zones) for a virtual keyboard, each respective default actuation region associated with: (i) a respective key of a plurality of keys on the virtual keyboard and (ii) a respective first metric that provides estimates, based on user input received at the virtual keyboard, that the respective key is an intended target of the user input. FIG. 5A provides an illustration of an example plurality of default actuation regions. In some embodiments, the first metrics are probability distribution functions (e.g., Gaussian distributions, as discussed above in reference to FIGS. 5A-5K).

In some embodiments, the method further includes: providing (704) a plurality of adaptive actuation regions (i.e., adaptive strike zones) for the virtual keyboard, each respective adaptive actuation region associated with: (i) a region of the touch-sensitive display within which a predetermined number of previous typing inputs (e.g., inputs from previous interactions with the virtual keyboard) have been received for a single key of the plurality of keys of the virtual keyboard and (ii) a respective second metric that provides estimates, based on user input received at the virtual keyboard, that the single key is an intended target of the user input (e.g., a shape is drawn around the predetermined number of typing inputs and that shape forms the adaptive actuation region for the respective key). An example plurality of adaptive actuation regions is pictured in FIG. 5B.

In some embodiments, the method also includes: receiving (706), at the virtual keyboard, typing inputs with an observed cadence.

In response to receiving the typing inputs (708), the method includes: (i) generating weighted metrics by adjusting at least one of the respective second metric and the respective first metric, wherein the adjusting is based at least in part on the observed cadence; and (ii) actuating keys on the virtual keyboard in accordance with the weighted metrics. For example, for a particular typing input, a key that is associated with the highest score for its respective weighted metric, is actuated in response to the particular typing input.

In some embodiments, each respective adaptive actuation region of the plurality of adaptive actuation regions is established by identifying a region of the touch-sensitive display that encompasses the predetermined number of previous typing inputs for a respective single key (as discussed above in reference to FIGS. 5A-5K).

In some embodiments, the method 700 further includes: receiving user input requesting to change the virtual keyboard to a new keyboard format and, in response to receiving the user input requesting to change the virtual keyboard to the new keyboard format, providing a new plurality of adaptive actuation regions that are associated with the new keyboard format. For example, the user requests to change from an alphanumeric keyboard to an emoji keyboard and, in response, the device 100 retrieves a new plurality of adaptive actuation regions that are associated with the emoji keyboard. In this way, the device 100 is able to improve typing accuracy for specific types of keyboards, as a user's typing patterns may be different for different types of keyboards.

In some embodiments, the plurality of adaptive actuation regions is a default plurality associated with the electronic device and the method further includes, after detecting the observed cadence, determining a user that is currently typing at the electronic device based at least in part on the observed cadence, and providing a new plurality of adaptive actuation regions that is specifically associated with the determined user. For example, if the device 100 is currently signed into a guest account, then the device 100 may use the default plurality initial and may be able to retrieve a user-specific plurality (i.e., the new plurality) after using the observed cadence to identify a specific user and then retrieving the user-specific plurality for that specific user.

In some embodiments, the plurality of adaptive actuation regions are provided for a predefined subset of the plurality of keys of the virtual keyboard. In some embodiments, the predefined subset corresponds to alphanumeric keys on the virtual keyboard.

In some embodiments, the method includes, after receiving each typing input in the typing inputs, determining an intended key associated with the typing input and updating a respective adaptive actuation region that is associated with the determined intended key (e.g., as discussed above in reference to FIGS. 5A-5K, shape and positions of actuation regions may change while a user is typing).

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

In some embodiments of the methods 600 and 700 discussed above, default and/or adaptive actuation regions move as a user moves their hand and/or finger positions on the keyboard 502. In this way, the device 100 is able to help ensure that input determinations remain accurate by shifting where the actuation regions are positioned to ensure that those positions correspond to a user's current hand and finger positions. Therefore, methods 600 and 700 may include any of the operations discussed above for moving positions of actuation regions in response to movement of a user's hand or fingers.

In accordance with some embodiments, FIG. 8 shows a functional block diagram of an electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein. For ease of discussion, the electronic device 800 is implemented as a portable multifunction device 100 (FIG. 1A).

As shown in FIG. 8, the electronic device 800, includes a display unit (e.g., display unit 801, FIG. 8), a touch-sensitive surface unit (e.g., touch-sensitive surface unit 803, FIG. 8), and a processing unit (e.g., processing unit 805, FIG. 8) coupled with the display unit 801 and the touch-sensitive surface unit 803. In some embodiments, the display unit and the touch-sensitive surface unit are integrated in a single touch-sensitive display unit (also referred to herein as a touch-sensitive display). In some embodiments, the processing unit includes an establishing unit (e.g., establishing unit 807), a providing unit (e.g., providing unit 809), a receiving unit (e.g., receiving unit 811), and a determining unit (e.g., determining unit 813). The processing unit is configured to: establish (e.g., with the establishing unit 807) a plurality of default actuation regions for a virtual keyboard, each respective default actuation region associated with a respective key of a plurality of keys on the virtual keyboard; provide (e.g., with the providing unit 809) a plurality of adaptive actuation regions for the virtual keyboard, each respective adaptive actuation region associated with a region of the touch-sensitive display unit within which a predetermined number of previous typing inputs have been received for a single key of the plurality of keys of the virtual keyboard; receive (e.g., with the receiving unit 811), at the virtual keyboard, a sequence of new typing inputs with an observed cadence, the sequence of new typing inputs including an ambiguous typing input that is within a first adaptive actuation region associated with a first key and is within a first default actuation region associated with a second key; in accordance with a determination that the observed cadence satisfies a cadence threshold, determine that the ambiguous typing input is associated with the first key (e.g., with the determining unit 813); and in accordance with a determination that the observed cadence does not satisfy the cadence threshold, determine that the ambiguous typing input is associated with the second key (e.g., with the determining unit 813).

In some embodiments of the electronic device 800, each respective adaptive actuation region of the plurality of adaptive actuation regions is established by identifying a region of the touch-sensitive display that encompasses the predetermined number of previous typing inputs for a respective single key.

In some embodiments of the electronic device 800, the processing unit is further configured to: receive user input requesting to change the virtual keyboard to a new keyboard format and, in response to receiving the user input requesting to change the virtual keyboard to the new keyboard format, provide a new plurality of adaptive actuation regions that are associated with the new keyboard format.

In some embodiments of the electronic device 800, the plurality of adaptive actuation regions are provided for a predefined subset of the plurality of keys of the virtual keyboard.

In some embodiments of the electronic device 800, the predefined subset corresponds to alphanumeric keys on the virtual keyboard.

In some embodiments of the electronic device 800, the plurality of adaptive actuation regions is a default plurality associated with the electronic device and the processing unit is further configured to: after detecting the observed cadence, determine a user that is currently typing at the electronic device based at least in part on the observed cadence, and provide a new plurality of adaptive actuation regions that is specifically associated with the determined user.

In some embodiments of the electronic device 800, the processing unit is further configured to: receive user feedback that changes the determined association for the ambiguous typing input to a new key and, in response to receiving the user feedback that changes the determined association, modify the adaptive actuation region associated with the new key.

In some embodiments of the electronic device 800, the processing unit is further configured to: after receiving each typing input in the sequence of typing inputs, determine an intended key associated with the typing input and updating a respective adaptive actuation region that is associated with the determined intended key.

In some embodiments of the electronic device 800, the cadence threshold is specifically associated with a current user of the electronic device.

In some embodiments of the electronic device 800, each respective default actuation region of the plurality of default actuation regions is associated with a respective first metric that provides estimates, based on user input at the virtual keyboard, that a respective key associated with a respective default actuation region is an intended target of the user input.

In some embodiments of the electronic device 800, each respective adaptive actuation region of the plurality of adaptive actuation regions is associated with a respective second metric that provides estimates, based on user input at the virtual keyboard, that a respective single key is an intended target of the user input.

In some embodiments of the electronic device 800, the first metrics and the second metrics are weighted in accordance with a plurality of weighting factors, the plurality of weighting factors including the observed cadence, predicted unigrams and n-grams based on the user input, and whether the electronic device is currently positioned in a substantially flat or a substantially angled position.

In accordance with some embodiments, FIG. 8 shows a functional block diagram of an electronic device 800 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 8 are, optionally, combined or separated into sub-blocks to implement the principles of the various described embodiments. Therefore, the description herein optionally supports any possible combination or separation or further definition of the functional blocks described herein. For ease of discussion, the electronic device 800 is implemented as a portable multifunction device 100 (FIG. 1A).

As shown in FIG. 9, the electronic device 900, includes a display unit (e.g., display unit 901, FIG. 9), a touch-sensitive surface unit (e.g., touch-sensitive surface unit 903, FIG. 9), and a processing unit (e.g., processing unit 905, FIG. 9) coupled with the display unit 901 and the touch-sensitive surface unit 903. In some embodiments, the display unit and the touch-sensitive surface unit are integrated in a single touch-sensitive display unit (also referred to herein as a touch-sensitive display). In some embodiments, the processing unit includes an establishing unit (e.g., establishing unit 907), a providing unit (e.g., providing unit 909), a receiving unit (e.g., receiving unit 911), an generating unit (e.g., generating unit 913), and an actuating unit (e.g., actuating unit 915). The processing unit is configured to: establish (e.g., with the establishing unit 907) a plurality of default actuation regions for a virtual keyboard, each respective default actuation region associated with: (i) a respective key of a plurality of keys on the virtual keyboard and (ii) a respective first metric that provides estimates, based on user input received at the virtual keyboard, that the respective key is an intended target of the user input; provide (e.g., with the providing unit 909) a plurality of adaptive actuation regions for the virtual keyboard, each respective adaptive actuation region associated with: (i) a region of the touch-sensitive display within which a predetermined number of previous typing inputs have been received for a single key of the plurality of keys of the virtual keyboard and (ii) a respective second metric that provides estimates, based on user input received at the virtual keyboard, that the single key is an intended target of the user input; receive (e.g., with the receiving unit 911), at the virtual keyboard, typing inputs with an observed cadence; in response to receiving the typing inputs: (i) generate (e.g., with the establishing unit 907) weighted metrics by adjusting at least one of the respective second metric and the respective first metric, wherein the adjusting is based at least in part on the observed cadence; and (ii) actuate (e.g., with the actuating unit 915) keys on the virtual keyboard in accordance with the weighted metrics.

In some embodiments of the electronic device 900, each respective adaptive actuation region of the plurality of adaptive actuation regions is established by identifying a region of the touch-sensitive display that encompasses the predetermined number of previous typing inputs for a respective single key.

In some embodiments of the electronic device 900, the processing unit is further configured to: receive user input requesting to change the virtual keyboard to a new keyboard format and, in response to receiving the user input requesting to change the virtual keyboard to the new keyboard format, provide a new plurality of adaptive actuation regions that are associated with the new keyboard format.

In some embodiments of the electronic device 900, the plurality of adaptive actuation regions is a default plurality associated with the electronic device and the processing unit is further configured to: after detecting the observed cadence, determine a user that is currently typing at the electronic device based at least in part on the observed cadence, and provide a new plurality of adaptive actuation regions that is specifically associated with the determined user.

In some embodiments of the electronic device 900, the plurality of adaptive actuation regions are provided for a predefined subset of the plurality of keys of the virtual keyboard.

In some embodiments of the electronic device 900, the predefined subset corresponds to alphanumeric keys on the virtual keyboard.

In some embodiments of the electronic device 900, the processing unit is further configured to: after receiving each typing input in the typing inputs, determine an intended key associated with the typing input and update a respective adaptive actuation region that is associated with the determined intended key.

The operations in the information processing methods described above are, optionally implemented by running one or more functional modules in information processing apparatus such as general purpose processors (e.g., as described above with respect to FIG. 1A) or application specific chips.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer-readable storage medium, storing one or more programs configured for execution by one or more processors of an electronic device with a touch-sensitive display, the one or more programs comprising instructions for:

establishing a plurality of default actuation regions for a virtual keyboard, each respective default actuation region associated with a respective key of a plurality of keys on the virtual keyboard;

providing a plurality of adaptive actuation regions for the virtual keyboard, each respective adaptive actuation region associated with a region of the touch-sensitive display within which a predetermined number of previous typing inputs have been received for a single key of the plurality of keys of the virtual keyboard;

receiving, at the virtual keyboard, a sequence of new typing inputs with an observed cadence, the sequence of new typing inputs including an ambiguous typing input that is within a particular adaptive actuation region associated with a first key and is within a particular default actuation region associated with a second key;

in accordance with a determination that the observed cadence satisfies a cadence threshold, determining that the ambiguous typing input is associated with the first key; and in accordance with a determination that the observed cadence does not satisfy the cadence threshold, determining that the ambiguous typing input is associated with the second key.

2. The non-transitory computer-readable storage medium of claim 1, wherein each respective adaptive actuation region of the plurality of adaptive actuation regions is established by identifying a region of the touch-sensitive display that encompasses the predetermined number of previous typing inputs for a respective single key.

3. The non-transitory computer-readable storage medium of claim 1, wherein the one or more programs include instructions for: receiving user input requesting to change the virtual keyboard to a new keyboard format and, in response to receiving the user input requesting to change the virtual keyboard to the new keyboard format, providing a new plurality of adaptive actuation regions that are associated with the new keyboard format.

4. The non-transitory computer-readable storage medium of claim 1, wherein the plurality of adaptive actuation regions are provided for a predefined subset of the plurality of keys of the virtual keyboard.

5. The non-transitory computer-readable storage medium of claim 4, wherein the predefined subset corresponds to alphanumeric keys on the virtual keyboard.

6. The non-transitory computer-readable storage medium of claim 1, wherein the plurality of adaptive actuation regions is a default plurality associated with the electronic device and the one or more programs include instructions for: after detecting the observed cadence, determining a user that is currently typing at the electronic device based at least in part on the observed cadence, and providing a new plurality of adaptive actuation regions that is specifically associated with the determined user.

7. The non-transitory computer-readable storage medium of claim 1, wherein the one or more programs include instructions for: receiving user feedback that changes the determined association for the ambiguous typing input to a new key and, in response to receiving the user feedback that changes the determined association, modifying the adaptive actuation region associated with the new key.

8. The non-transitory computer-readable storage medium of claim 1, wherein the one or more programs include instructions for: after receiving each typing input in the sequence of typing inputs, determining an intended key associated with a respective typing input, other than the ambiguous typing input, and updating a respective adaptive actuation region that is associated with the determined intended key.

9. The non-transitory computer-readable storage medium of claim 1, wherein the cadence threshold is specifically associated with a current user of the electronic device.

10. The non-transitory computer-readable storage medium of claim 1, wherein each respective default actuation region of the plurality of default actuation regions is associated with a respective first metric that provides estimates, based on user input at the virtual keyboard, that a respective key associated with a respective default actuation region is an intended target of the user input.

11. The non-transitory computer-readable storage medium of claim 10, wherein each respective adaptive actuation region of the plurality of adaptive actuation regions is associated with a respective second metric that provides estimates, based on the user input at the virtual keyboard, that a respective single key is the intended target of the user input.

12. The non-transitory computer-readable storage medium of claim 11, wherein the first metrics and the second metrics are weighted in accordance with a plurality of weighting factors, the plurality of weighting factors including the observed cadence, predicted unigrams and n-grams based on the user input, and whether the electronic device is currently positioned in a substantially flat or a substantially angled position.

13. A method, comprising:
at an electronic device with a touch-sensitive display:
establishing a plurality of default actuation regions for a virtual keyboard, each respective default actuation region associated with a respective key of a plurality of keys on the virtual keyboard;
providing a plurality of adaptive actuation regions for the virtual keyboard, each respective adaptive actuation region associated with a region of the touch-sensitive display within which a predetermined number of previous typing inputs have been received for a single key of the plurality of keys of the virtual keyboard;
receiving, at the virtual keyboard, a sequence of new typing inputs with an observed cadence, the sequence of new typing inputs including an ambiguous typing input that is within a particular adaptive actuation region associated with a first key and is within a particular default actuation region associated with a second key;
in accordance with a determination that the observed cadence satisfies a cadence threshold, determining that the ambiguous typing input is associated with the first key; and
in accordance with a determination that the observed cadence does not satisfy the cadence threshold, determining that the ambiguous typing input is associated with the second key.

14. The method of claim 13, further comprising, receiving user input requesting to change the virtual keyboard to a new keyboard format and, in response to receiving the user input requesting to change the virtual keyboard to the new keyboard format, providing a new plurality of adaptive actuation regions that are associated with the new keyboard format.

15. The method of claim 13, wherein the plurality of adaptive actuation regions is a default plurality associated with the electronic device and the method further comprises, after detecting the observed cadence, determining a user that is currently typing at the electronic device based at least in part on the observed cadence, and providing a new plurality of adaptive actuation regions that is specifically associated with the determined user.

16. The method of claim 13, further comprising, receiving user feedback that changes the determined association for the ambiguous typing input to a new key and, in response to receiving the user feedback that changes the determined association, modifying the adaptive actuation region associated with the new key.

17. The method of claim 13, wherein each respective default actuation region of the plurality of default actuation regions is associated with a respective first metric that provides estimates, based on user input at the virtual keyboard, that a respective key associated with a respective default actuation region is an intended target of the user input.

18. The method of claim 17, wherein each respective adaptive actuation region of the plurality of adaptive actuation regions is associated with a respective second metric that provides estimates, based on the user input at the virtual keyboard, that a respective single key is the intended target of the user input.

19. The method of claim 18, wherein the first metrics and the second metrics are weighted in accordance with a plurality of weighting factors, the plurality of weighting factors including the observed cadence, predicted unigrams and n-grams based on the user input, and whether the electronic device is currently positioned in a substantially flat or a substantially angled position.

20. The method of claim 13, wherein each respective adaptive actuation region of the plurality of adaptive actuation regions is established by identifying a region of the touch-sensitive display that encompasses the predetermined number of previous typing inputs for a respective single key.

21. The method of claim 13, wherein the plurality of adaptive actuation regions are provided for a predefined subset of the plurality of keys of the virtual keyboard.

22. The method of claim 21, wherein the predefined subset corresponds to alphanumeric keys on the virtual keyboard.

23. The method of claim 13, further comprising: after receiving each typing input in the sequence of typing inputs, determining an intended key associated with a respective typing input, other than the ambiguous typing input, and updating a respective adaptive actuation region that is associated with the determined intended key.

24. The method of claim 13, wherein the cadence threshold is specifically associated with a current user of the electronic device.

25. An electronic device, comprising:
a touch-sensitive display;
one or more processors; and
memory storing one or more programs which, when executed by the one or more processors, cause the electronic device to:
establish a plurality of default actuation regions for a virtual keyboard, each respective default actuation region associated with a respective key of a plurality of keys on the virtual keyboard;
provide a plurality of adaptive actuation regions for the virtual keyboard, each respective adaptive actuation region associated with a region of the touch-sensitive display within which a predetermined number of previous typing inputs have been received for a single key of the plurality of keys of the virtual keyboard;

receive, at the virtual keyboard, a sequence of new typing inputs with an observed cadence, the sequence of new typing inputs including an ambiguous typing input that is within a particular adaptive actuation region associated with a first key and is within a particular default actuation region associated with a second key;

in accordance with a determination that the observed cadence satisfies a cadence threshold, determine that the ambiguous typing input is associated with the first key; and in accordance with a determination that the observed cadence does not satisfy the cadence threshold, determine that the ambiguous typing input is associated with the second key.

26. The electronic device of claim 25, wherein each respective adaptive actuation region of the plurality of adaptive actuation regions is established by identifying a region of the touch-sensitive display that encompasses the predetermined number of previous typing inputs for a respective single key.

27. The electronic device of claim 25, wherein the one or more programs, when executed by the one or more processors, also cause the electronic device to: receive user input requesting to change the virtual keyboard to a new keyboard format and, in response to receiving the user input requesting to change the virtual keyboard to the new keyboard format, provide a new plurality of adaptive actuation regions that are associated with the new keyboard format.

28. The electronic device of claim 25, wherein the plurality of adaptive actuation regions are provided for a predefined subset of the plurality of keys of the virtual keyboard.

29. The electronic device of claim 28, wherein the predefined subset corresponds to alphanumeric keys on the virtual keyboard.

30. The electronic device of claim 25, wherein the plurality of adaptive actuation regions is a default plurality associated with the electronic device and the one or more programs, when executed by the one or more processors, also cause the electronic device to: after detecting the observed cadence, determine a user that is currently typing at the electronic device based at least in part on the observed cadence, and provide a new plurality of adaptive actuation regions that is specifically associated with the determined user.

31. The electronic device of claim 25, wherein the one or more programs, when executed by the one or more processors, also cause the electronic device to: receive user feedback that changes the determined association for the ambiguous typing input to a new key and, in response to receiving the user feedback that changes the determined association, modify the adaptive actuation region associated with the new key.

32. The electronic device of claim 25, wherein the one or more programs, when executed by the one or more processors, also cause the electronic device to: after receiving each typing input in the sequence of typing inputs, determine an intended key associated with a respective typing input, other than the ambiguous typing input, and update a respective adaptive actuation region that is associated with the determined intended key.

33. The electronic device of claim 25, wherein the cadence threshold is specifically associated with a current user of the electronic device.

34. The electronic device of claim 25, wherein each respective default actuation region of the plurality of default actuation regions is associated with a respective first metric that provides estimates, based on user input at the virtual keyboard, that a respective key associated with a respective default actuation region is an intended target of the user input.

35. The electronic device of claim 34, wherein each respective adaptive actuation region of the plurality of adaptive actuation regions is associated with a respective second metric that provides estimates, based on the user input at the virtual keyboard, that a respective single key is the intended target of the user input.

36. The electronic device of claim 35, wherein the first metrics and the second metrics are weighted in accordance with a plurality of weighting factors, the plurality of weighting factors including the observed cadence, predicted unigrams and n-grams based on the user input, and whether the electronic device is currently positioned in a substantially flat or a substantially angled position.

* * * * *